United States Patent
Suzuki et al.

(10) Patent No.: US 7,925,930 B2
(45) Date of Patent: Apr. 12, 2011

(54) STORAGE CONTROL SYSTEM AND CONTROL METHOD FOR STORAGE CONTROL SYSTEM

(75) Inventors: Hiroshi Suzuki, Sagamihara (JP); Hiromi Matsushige, Hiratsuka (JP); Tetsuya Inoue, Odawara (JP); Masato Ogawa, Chigasaki (JP); Tomokazu Yokoyama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 737 days.

(21) Appl. No.: 11/968,207

(22) Filed: Jan. 2, 2008

(65) Prior Publication Data

US 2008/0177906 A1    Jul. 24, 2008

(30) Foreign Application Priority Data

Jan. 18, 2007 (JP) ................... 2007-008705

(51) Int. Cl.
G06F 12/00 (2006.01)
(52) U.S. Cl. ............... 714/42; 714/6; 710/14
(58) Field of Classification Search ............... 714/7, 42; 710/14
See application file for complete search history.

(56) References Cited

U.S. PATENT DOCUMENTS

| | | | |
|---|---|---|---|
| 6,182,163 B1 * | 1/2001 | Yamashita et al. | 710/12 |
| 2003/0191891 A1 | 10/2003 | Tanaka et al. | |
| 2004/0078663 A1 * | 4/2004 | Inaba | 714/22 |
| 2005/0270680 A1 * | 12/2005 | Sone | 360/69 |
| 2006/0007578 A1 * | 1/2006 | Suzuki et al. | 360/71 |
| 2006/0168358 A1 * | 7/2006 | Liang et al. | 710/8 |
| 2006/0193189 A1 * | 8/2006 | Nam | 365/223 |
| 2007/0002847 A1 * | 1/2007 | Inamura et al. | 370/360 |
| 2008/0040541 A1 * | 2/2008 | Brockmann | 711/114 |

FOREIGN PATENT DOCUMENTS

JP     2003-303055     10/2003

* cited by examiner

*Primary Examiner* — Scott T Baderman
*Assistant Examiner* — Chae Ko
(74) *Attorney, Agent, or Firm* — Brundidge & Stanger, P.C.

(57) ABSTRACT

A storage control system of the present invention can carry out settings for a storage device using redundantly configured access channels. A controller of the storage control system can access a storage device using a plurality of access channels of system A and system B. Respective I/F control units each comprise a plurality of normally open-type switches. The switches of system A and the switches of system B are respectively wired-OR connected. A disk control unit outputs a control signal to an I/F control unit on the basis of a setting table. When a failure occurs in an I/F control unit of system A, the output signals of the respective switches transfer to a high-impedance state. Therefore, a storage device can be set by outputting, from an I/F control unit of system B, a signal corresponding to a desired operational mode and identification information.

14 Claims, 16 Drawing Sheets

STORAGE CONTROL SYSTEM AND CONTROL METHOD FOR STORAGE CONTROL SYSTEM

CROSS-REFERENCE TO RELATED APPLICATIONS

This application relates to and claims priority from Japanese Patent Application No. 2007-8705 filed on Jan. 18, 2007, the entire disclosure of which is incorporated herein by reference.

BACKGROUND OF THE INVENTION

1. Field of the Invention

The present invention relates to a storage control system and a method of controlling the storage control system.

2. Description of the Related Art

A storage control system is configured by arranging hard disc storage devices and other such storage devices in an array, and, for example, provides a storage area based on RAID (Redundant Array of Independent Disks) to a host computer (hereinafter, may be abbreviated as host). At least one or more logical volumes are formed on a physical storage area provided by a group of storage devices, and this logical volume is provided to a host. A host reads or writes data from or to a logical volume by sending a prescribed command.

Here, a plurality of storage devices are connected via a daisy-chain mode, or via a crossbar switch (Japanese Patent Laid-open No. 2003-303055).

A storage device, for example, may comprise a plurality of types of operating modes. Further, in order to use a storage device, a storage control system must preset in the respective storage devices identification information for specifying each storage device. However, the above-mentioned literature discloses neither a constitution nor a method for setting an operating mode or identification information in the storage devices.

If a failure of some kind should occur in a control circuit for controlling the storage devices, it becomes impossible to set an operating mode or identification information in the storage devices. Consequently, it becomes impossible to operate a storage control system normally, lowering reliability and ease of use. In particular, there has been a trend in recent years to increase the capacity of storage control systems, and the number of storage devices managed by each control circuit is increasing. Therefore, if any one of the control circuits of a plurality of control circuits fails, a large number of storage devices become unusable as a result, causing the adverse affects to become widespread.

In particular, whereas storage control systems are being used for a relatively long number of years, storage device and storage device peripheral technologies are advancing rapidly, promoting generational upgrades. Therefore, there is the likelihood of a plurality of generations of storage devices having different specifications being included inside a storage control system. In order to use storage devices having different specifications like this, the settings of each storage device must be changed. However, the prior art does not give enough consideration to a redundant constitution for changing the settings of the storage devices, leaving room for improvement.

SUMMARY OF THE INVENTION

With the foregoing problems in view, it is an object of the present invention to provide a storage control system and a storage system control method that are capable of enhancing failure resistance and reliability. Another object of the present invention is to provide a storage control system and a storage system control method, which makes the control configuration for setting the device state of a storage device redundant such that, when an abnormality occurs in any one control configuration, the device state of a storage device can be set using another control configuration. Other objects of the present invention should become clear from the description of the embodiments, which will be explained hereinbelow.

A storage control system according to one aspect of the present invention, which is designed to solve for the above-mentioned problems, comprises at least one or more storage devices for which device states are set in accordance with a combination of the signal values of a plurality of first signals respectively inputted via a plurality of signal lines; a first setting circuit, which is connected via the signal lines to a storage device, and which respectively outputs a first signal over the signal lines in accordance with an inputted second signal; a second setting circuit, which is logical OR connected to the first setting circuit, and which respectively outputs a first signal over the signal lines in accordance with an inputted second signal; a first device controller for respectively outputting the first signals from the first setting circuit by applying a second signal to the first setting circuit; and a second device controller for respectively outputting the first signals from the second setting circuit by applying a second signal to the second setting circuit. Then, each first signal is constituted so as to take any one signal value of either an open state or a low-voltage state, and, a device state respectively comprises an initial state and a plurality of other states, and, in addition, a combination of signal values of the first signals for setting the initial state and a combination of signal values of the first signals for respectively setting a plurality of other states are set in advance so as to differ from one another.

In an embodiment of the present invention, when the signal values of the first signals are respectively in the open state, the device state is set to the initial state.

In an embodiment of the present invention, the first setting circuit and the second setting circuit are respectively constituted comprising a plurality of switching elements for respectively outputting first signals over the signal lines; and a control unit for respectively outputting from the switching elements in accordance with a second signal a first signal of a signal value of either an open state or a low-voltage state.

In an embodiment of the present invention, each switching element is constituted as a normally open-type transistor, in which the base is connected to the control unit, the collector is connected to a storage device via a diode for preventing reverse connection, and the emitter is grounded.

In an embodiment of the present invention, the control unit can also be constituted comprising a plurality of manual switches respectively connected to each switching element.

In an embodiment of the present invention, the first setting circuit and the second setting circuit can also comprise a monitoring unit for monitoring the signal values of first signals respectively outputted from the switching elements.

In an embodiment of the present invention, a storage device respectively acquires the signal values of the first signals via the signal lines at startup, and sets a device state in accordance with a combination of acquired signal values.

In an embodiment of the present invention, the settings of the plurality of other states comprise at least any one of either an identification information setting for specifying a storage device, or a storage device operational mode setting.

In an embodiment of the present invention, when a failure occurs in the first device controller, the first device controller requests initialization from the first setting circuit, and consequently, the first setting circuit sets all the signal values of the first signals to the open state, and respectively outputs same over the signal lines, and the device state is set by the first signals to be outputted from the second setting circuit, and when a failure occurs in the second device controller, the second device controller requests initialization from the second setting circuit, and consequently, the second setting circuit sets all the signal values of the first signals to the open state, and respectively outputs same over the signal lines, and the device state is set by the first signals to be outputted from the first setting circuit.

In an embodiment of the present invention, the first setting circuit and the second setting circuit are connected to one another, and can be constituted such that when a failure occurs in the first device controller, the second setting circuit requests initialization from the first setting circuit, and consequently, the first setting circuit sets all the signal values of the first signals to the open state, and respectively outputs same over the signal lines, and the device state is set by the first signals to be outputted from the second setting circuit, and when a failure occurs in the second device controller, the first setting circuit requests initialization from the second setting circuit, and consequently, the second setting circuit sets all the signal values of the first signals to the open state, and respectively outputs same over the signal lines, and the device state is set by the first signals to be outputted from the first setting circuit.

A storage system control method according to another aspect of the present invention is a control method for a storage control system having a plurality of storage devices for which device states are set in accordance with a combination of the signal values of a plurality of first signals respectively inputted via a plurality of signal lines; a first setting circuit which is connected via the signal lines to a storage device, and which respectively outputs a first signal over the signal lines in accordance with an inputted second signal; a second setting circuit which is logical OR connected to the first setting circuit, and which respectively outputs a first signal over the signal lines in accordance with an inputted second signal; a first device controller for respectively outputting first signals from the first setting circuit by applying a second signal to the first setting circuit; and a second device controller for respectively outputting first signals from the second setting circuit by applying a second signal to the second setting circuit, and each first signal is constituted so as to take any one signal value of either an open state or a low-voltage state, and, a device state comprises an initial state and a plurality of other states, and a combination of signal values of the first signals for setting the initial state, and a combination of signal values of the first signals for respectively setting the plurality of other states are set in advance so as to differ from one another, and, in addition, the control method executes a failure detection step of detecting whether or not a failure has occurred in any of either the first device controller or the second device controller, and a setting step in which, when a failure has been detected, the normal device controller for which a failure was not detected outputs over the signal lines a desired combination of signal values of first signals using the setting circuit, of the first setting circuit and second setting circuit, which is connected to the normal device controller.

The storage system control method can further comprise an initialization step of, between the failure detection step and the setting step, respectively outputting over the signal lines first signals for setting a device state to the initial state from the setting circuit, of the first setting circuit and the second setting circuit, which is connected to the device controller in which a failure is detected.

A storage system control method according to yet another aspect of the present invention is a control method for a storage control system having a plurality of storage devices for which device states are set in accordance with a combination of the signal values of a plurality of first signals respectively inputted via a plurality of signal lines; a first setting circuit which is connected via the signal lines to a storage device, and which respectively outputs a first signal over the signal lines in accordance with an inputted second signal; a second setting circuit which is logical OR connected to the first setting circuit, and which respectively outputs a first signal over the signal lines in accordance with an inputted second signal; a first device controller for respectively outputting first signals from the first setting circuit by applying a second signal to the first setting circuit; and a second device controller for respectively outputting first signals from the second setting circuit by applying a second signal to the second setting circuit, and each first signal is constituted so as to take any one signal value of either an open state or a low-voltage state, and, a device state comprises an initial state and a plurality of other states, and a combination of signal values of the first signals for setting the initial state, and a combination of signal values of the first signals for respectively setting the plurality of other states are set in advance so as to differ from one another, and, in addition, the control method executes a failure detection step of detecting whether or not a failure has occurred in any of either the first setting circuit or the second setting circuit, and a setting step in which, when a failure has been detected, the normal setting circuit for which a failure was not detected outputs over the signal lines a desired combination of signal values of first signals.

The storage system control method can further comprise an initialization step of, between the failure detection step and the setting step, respectively outputting over the signal lines first signals for setting a device state to the initial state from the setting circuit, of either the first setting circuit or the second setting circuit, in which a failure is detected.

Either all or a part of means, functions and steps of the present invention can be constituted as a computer program, which is executed by a computer system. When either all or a part of the constitution of the present invention is constituted from a computer program, this computer program, for example, can be fixed to a variety of storage media and distributed, or it can be sent via a communications network.

DESCRIPTION OF THE PREFERRED EMBODIMENTS

Figure 1:
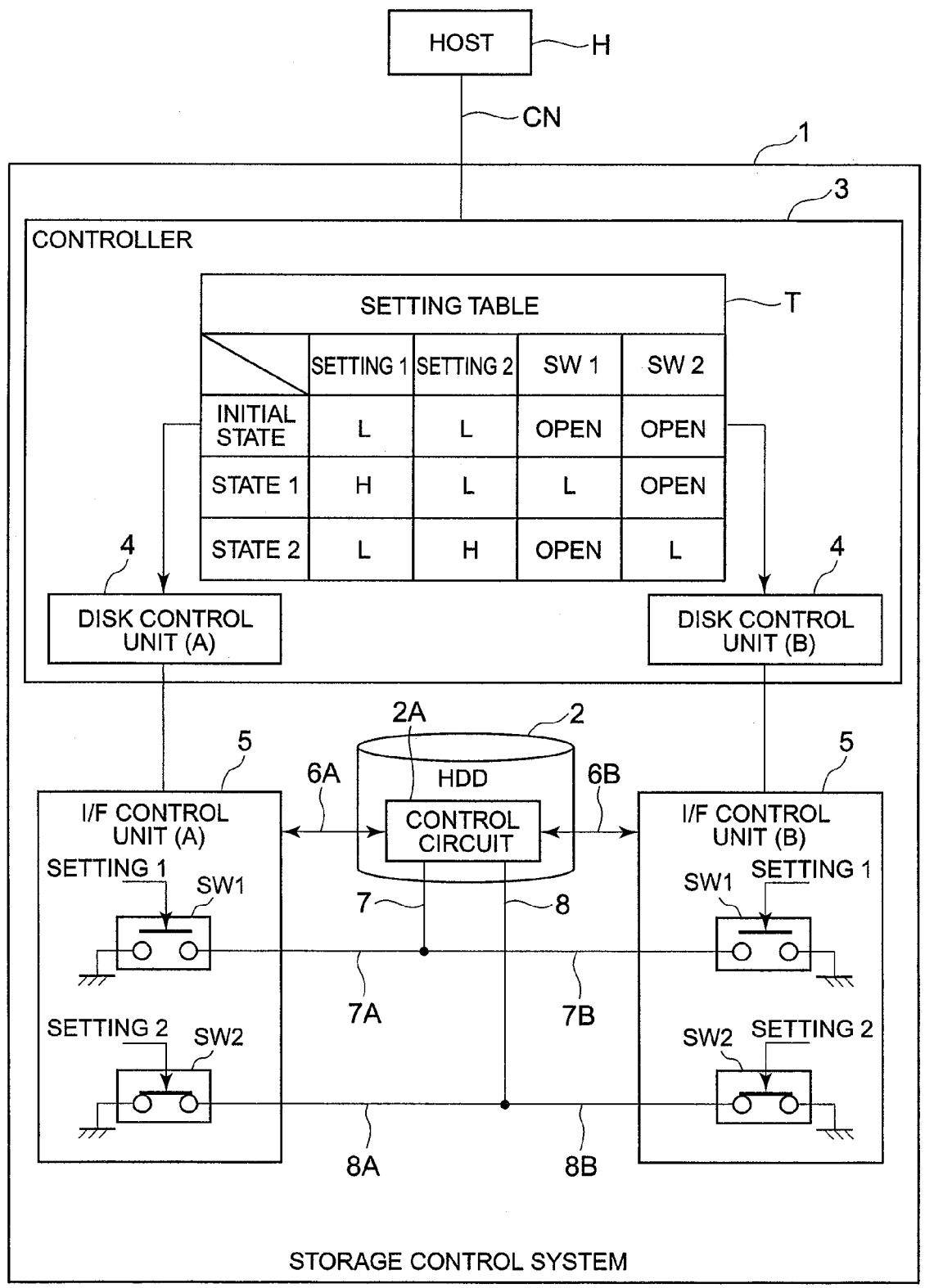
FIG. 1 is a schematic diagram showing an overview of an embodiment of the present invention.

FIG. 1 is a block diagram showing an overview of an entire embodiment of the present invention. A storage control system 1 of this embodiment, for example, is connected to a host H via a communication channel that uses a SAN (Storage Area Network), LAN (Local Area Network), or the Internet. The storage control system 1 provides large-capacity data storage service to a host H. A host H, for example, can be constituted from a variety of computer devices, such as a server computer, mainframe machine, or workstation. A host H, for example, can issue a command requesting a data readout (read command), a command requesting a data write (write command) or another command to the storage control system 1.

The storage control system 1, for example, is constituted comprising at least one or more storage devices 2; a controller 3; and a plurality of interface (hereinafter, abbreviated as I/F) control units 5. The controller 3, for example, comprises a setting table T, and a plurality of disk control units 4. A storage device 2 is equivalent to a "storage device", and each disk control unit 4 is equivalent to either a "first device controller" or a "second device controller". Each I/F control unit 5 is equivalent to either a "first setting circuit" or a "second setting circuit".

A storage device 2, for example, is constituted as a hard disk drive. However, it is not limited to a hard disk drive, and, for example, can also be a semiconductor memory device, such as a flash memory device, an optical disk drive, magneto-optical disk drive, magnetic tape drive, or other such storage device. In the case of a hard disk drive, for example, it is possible to use various types of hard disk drives, such as a FC (Fibre Channel) disk, SATA (Serial AT Attachment) disk, SCSI (Small Computer System Interface) disk, and SAS (Serial Attached SCSI) disk. Furthermore, for example, a hybrid-type hard disk drive having a flash memory device built into the hard disk drive can also be used.

A storage device 2 comprises a control circuit 2A. The control circuit 2A is a circuit for setting the device state of the storage device 2, and controlling the operation of the storage device 2. The control circuit 2A is respectively connected to I/F control units 5 via data signal lines 6A and 6B, and setting signal lines 7 and 8.

Data signal lines 6A and 6B are used for transferring data between a storage device 2 and the I/F control units 5. Setting signal lines 7 and 8 are used for setting the device state of a storage device 2.

The controller 3 is for controlling the operation of the storage control system 1. The controller 3 can be constituted from a computer device, which comprises at least one or more microprocessors, a program memory and a cache memory. The controller 3, for example, is constituted comprising a function for exchanging data with a host H, a function for exchanging data with a storage device 2, and a function for temporarily storing data.

A disk control unit 4 is for exchanging data with a storage device 2. Disk control units 4 are respectively connected to a I/F control unit 5, and are respectively connected to a storage device 2 via this connected I/F control unit 5.

Normally, a plurality of I/F control units 5 are respectively connected to the disk control units 4, and a plurality of storage devices 2 are respectively connected to the I/F control units 5. In this embodiment, the constitution of the storage control system 1 is shown in simplified form as an aid to understanding the invention. A more detailed constitution will be made clear by the embodiments to be explained hereinbelow.

The storage control system 1 establishes two channels, system A and system B, for a single storage device 2. In the figure, system A is displayed as (A), and system B is displayed as (B). For example, system A is the primary channel utilized at normal times, and system B is the secondary channel used when a failure occurs. That is, the channel for inputting/outputting data to/from a storage device 2 has been made redundant.

Normally, the controller 3 accesses a storage device 2, and performs data read/write using the disk control unit 4, I/F control unit 5, and data signal line 6A of system A shown in the left side in the figure. When a failure of some sort occurs on the system A channel, the controller 3 can access a storage device 2 and perform data read/write operations using the disk control unit 4, I/F control unit 5, and data signal line 6B of system B shown in the right side in the figure.

The I/F control units 5 are for exchanging data with a storage device 2 in accordance with indications from a disk control unit 4, and setting the device state of a storage device 2. I/F control units 5, for example, respectively comprise a plurality of switches SW1, SW2. These switches SW1, SW2 are equivalent of "switching elements". A signal outputted from the switches SW1, SW2 is equivalent to a "first signal".

The switches SW1, SW2, for example, are constituted as transistors, relays, or other such switches, and output either of an open state or a low-voltage state. An open state signifies that the channel of a signal line is open, and in a high impedance state. A low-voltage state signifies a state in which the voltage value of the signal line is lowered to 0 volts, or close to 0 volts. When a switch SW1, SW2 is open, it is an open state, and when a switch SW1, SW2 is closed, it is a low-voltage state. Switches SW1 and SW2 are respectively constituted as normally open-type switches. That is, when the setting signal for operating switches SW1 and SW2 stops, switches SW1 and SW2 both open, and maintain an open state (high impedance state).

The switches SW1 of the one side inside the I/F control units 5 are respectively connected to the setting signal line 7 of the one side, and the switches SW2 of the other side inside the I/F control units 5 are respectively connected to the setting signal line 8 of the other side. More specifically, the switch SW1 of system A is connected to signal line 7 via signal line 7A, and the switch SW1 of system B is connected to signal line 7 via signal line 7B. Signal line 7 is connected to the control circuit 2A inside the storage device 2. Similarly, the switch SW2 of system A is connected to signal line 8 via signal line 8A, and the switch SW2 of system B is connected to signal line 8 via signal line 8B. Then, signal line 8 is connected to the control circuit 2A.

That is, system A switch SW1 and system B switch SW1, and system A switch SW2 and system B switch SW2 are respectively wired-OR connected. If the system A switch SW1 is in the open state when the system B switch SW1 is in the low-voltage state, a low-voltage-state signal is generated on signal line 7. Similarly, if the system A switch SW2 is in the low-voltage state when the system B switch SW2 is in the open state, a low-voltage-state signal is generated on signal line 8.

That is, an open-state signal is generated on signal line 7 only when the switches SW1 of the respective systems are both in the open state. When the switch of either side is closed, and it is a low-voltage state, a low-voltage-state signal is generated on signal line 7. Similarly, an open-state signal is generated on signal line 8 only when the switches SW2 of the respective systems are both in the open state, and when the switch SW2 of either side is closed, and it is a low-voltage state, a low-voltage-state signal is generated on signal line 8.

The outputs of the switches SW1, SW2 of the respective systems are controlled based on an indication from a disk control unit 4. The switches SW1, SW2 open and close in accordance with a setting signal (shown as setting 1 and setting 2 in the figure). For example, in the respective systems, a control signal of a plurality of bits (two bits in this embodiment) is inputted to an I/F control unit 5 from a disk control unit 4. The I/F control unit 5 generates a setting signal corresponding to the control signal inputted from the disk control unit 4, opening and closing the respective switches SW1, SW2 inside the I/F control unit 5.

A disk control unit 4 outputs a control signal to an I/F control unit 5 based on the contents stored in the setting table T. A control signal outputted to an I/F control unit 5 from a disk control unit 4 is equivalent to a "second signal". The setting table T, for example, correspondently stores a plurality of device states of the storage device 2, a combination of setting signal values, and a combination of signal values of switches SW1 and SW2.

A device state, for example, can include an identification information setting state for the storage control system 1 to respectively identify a plurality of storage devices 2, and an operational mode setting state for a storage device 2. Identification information, for example, can include an arbitrated loop physical address (ALPA). In this embodiment, an operational mode will be explained as an example of a device state. In this case, for example, "state 1" inside the setting table T is a 4 GBps mode, and "state 2" is a 2 GBps mode. 4 GBps and 2 GBps denote the data transfer rate of a storage device 2. Therefore, state 1 can also be called a high-speed transfer mode, and state 2 can also be called a low-speed transfer mode.

When the values of signals outputted from switches SW1 and SW2 are both open state ("open" in the figure), the storage device 2 is set to the initial state. That is, when a high impedance state (open state) is generated on the setting signal lines 7, 8, the control circuit 2A resets the transfer mode of the storage device 2, returning it to the initial state.

When the signal value of switch SW1 is the low-voltage state ("L" in the figure), and the signal value of switch SW2 is the open state, the storage device 2 is set to the high-speed transfer mode. When a low-voltage state is generated on setting signal line 7, and a high impedance state is generated on setting signal line 8, the control circuit 2A sets the transfer mode of the storage device 2 to the high-speed transfer mode.

By contrast, when the signal value of switch SW1 is the open state, and the signal value of switch SW2 is the low-voltage state, the storage device 2 is set to the low-speed transfer mode. When a high impedance state is generated on setting signal line 7, and a low-voltage state is generated on setting signal line 8, the control circuit 2A sets the transfer mode of the storage device 2 to the low-speed transfer mode.

Furthermore, the setting of the operational mode (transfer mode) was given as an example in this explanation, but storage device 2 identification information is set the same way. For example, identification information is constituted from two most significant bits, which are changeable, and six least significant bits, which are fixed, and the most significant two bits can be rewritten in accordance with an indication from the controller 3. Accordingly, it is possible to rewrite the identification information of a plurality of storage devices 2.

The operational mode of a storage device 2, for example, is set when the storage control system 1 starts up. That is, prior to the storage control system 1 commencing operation, the controller 3 sets the operational mode of a storage device 2 using a disk control unit 4 and an I/F control unit 5. The disk control unit 4 outputs a control signal to the I/F control unit 5 in accordance with an indication from the controller 3. The I/F control unit 5 controls the opening and closing of the switches SW1, SW2 in accordance with the control signal from the disk control unit 4. Accordingly, the switches SW1, SW2 respectively output to signal lines 7 and 8 signal values for producing a desired device state.

The control circuit 2A inside a storage device 2 acquires the signal values of the respective signal lines 7, 8 when power is supplied and the storage device 2 is started up, and sets the operational mode of the storage device 2 in accordance with the combination of acquired signal values. For example, when the signal value of signal line 7 is the low-voltage state, and the signal value of signal line 8 is the high impedance state at storage device 2 start-up, the control circuit 2A sets the transfer mode of the storage device 2 to the high-speed transfer mode. Further, for example, when the signal value of signal line 7 is the high impedance state, and the signal value of signal line 8 is the low-voltage state at storage device 2 start-up, the control circuit 2A sets the transfer mode of the storage device 2 to the low-speed transfer mode.

Here, as described above, system A switches SW1 and SW2, and system B switches SW1 and SW2 are respectively wired-OR connected. Therefore, if either one of the switches is in the low-voltage state, the signal value that is generated on the signal line connected to this switch is a low-voltage state. Then, in this embodiment, a situation in which both signal lines 7 and 8 are in the high impedance state is defined as the initial state. Therefore, of the respective switches SW1, SW2 of either system A or system B, it is possible to set the operational mode of a storage device 2 by operating only the switches SW1, SW2 of either one of the systems.

More specifically, in the initial state, the switches SW1, SW2 of each system are respectively open, and high impedance state signal values are emerging on the signal lines 7, 8. Thus, when using the storage device 2 in the high-speed transfer mode, simply closing switch SW1 of system A alone transitions the signal value of signal line 7 to the low-voltage state. The signal value of signal line 8 is maintained in the high impedance state. Therefore, the storage device 2 is set to the high-speed transfer mode as registered in setting table T.

Further, when using the storage device 2 in the low-speed transfer mode, simply closing switch SW2 of system A alone transitions the signal value of signal line 8 to the low-voltage state, and the signal value of signal line 7 is maintained in the high impedance state. Therefore, the storage device 2 is set to the low-speed transfer mode. Although the explanation is omitted, it will be readily understood by a person with ordinary skill in the art that storage device 2 identification information can be set in the same manner as an operational mode is set.

Thus, prior to operation of the storage control system 1 being commenced, the operational mode and identification information of a storage device 2 are set. If a failure of some sort should occur in system A under normal use, the operational mode and identification information of a storage device 2 can be set from system B.

However, consideration is also given to changing the operational mode and so forth of a storage device 2 subsequent to the commencement of storage control system 1 operation. When changing the setting of a storage device 2 during operation, the signal values emerging on the respective signal lines 7, 8 must be initialized, and respectively returned to the high impedance state. Thus, the controller 3 uses the disk control unit 4 and I/F control unit 5 of system A to return the signal values of signal lines 7 and 8, respectively, to the high impedance state. Thereafter, the operational mode and identification information of the storage device 2 is set by creating the desired combination of signal values as described for the settings prior to the start of operation.

When a failure of some sort occurs in system A when setting changes are made after operation has commenced, the signal value being outputted from the I/F control unit 5 of system A must be reset. Accordingly, as will be described in the embodiments explained hereinbelow, the I/F control unit 5 of system A respectively opens switches SW1 and SW2, and returns the respective signal values to the high impedance state.

Because the switches SW1, SW2 inside the respective I/F control units 5 are respectively constituted as normally open-type switches, when a failure occurs in the power supply unit of the I/F control unit 5 of system A, and output voltage is gone, the switches SW1, SW2 both open and the high impedance state is respectively generated on the signal lines 7, 8. Thus, when the system A I/F control unit becomes inoperable, the signal values being respectively outputted from the switches SW1, SW2 inside the I/F control unit 5 of system A transition to the high impedance state without requesting the system A I/F control unit 5 to initialize signal values. Therefore, the operational mode or identification information of the storage device 2 can be changed by outputting signal values corresponding to a desired operational mode or identification information from the system B I/F control unit 5.

Thus, according to this embodiment, the operational mode and identification information of the storage device 2 can be set from both system A and system B, and even if a failure should occur in either one of the systems, storage device 2 settings can be changed from the other system. Accordingly, even when a failure occurs in a disk control unit 4 or an I/F control unit 5, the adverse affects of this failure can be suppressed, making it possible to enhance the failure resistance and reliability of the storage control system 1. This embodiment will be explained in detail hereinbelow.

First Embodiment

Figure 2:
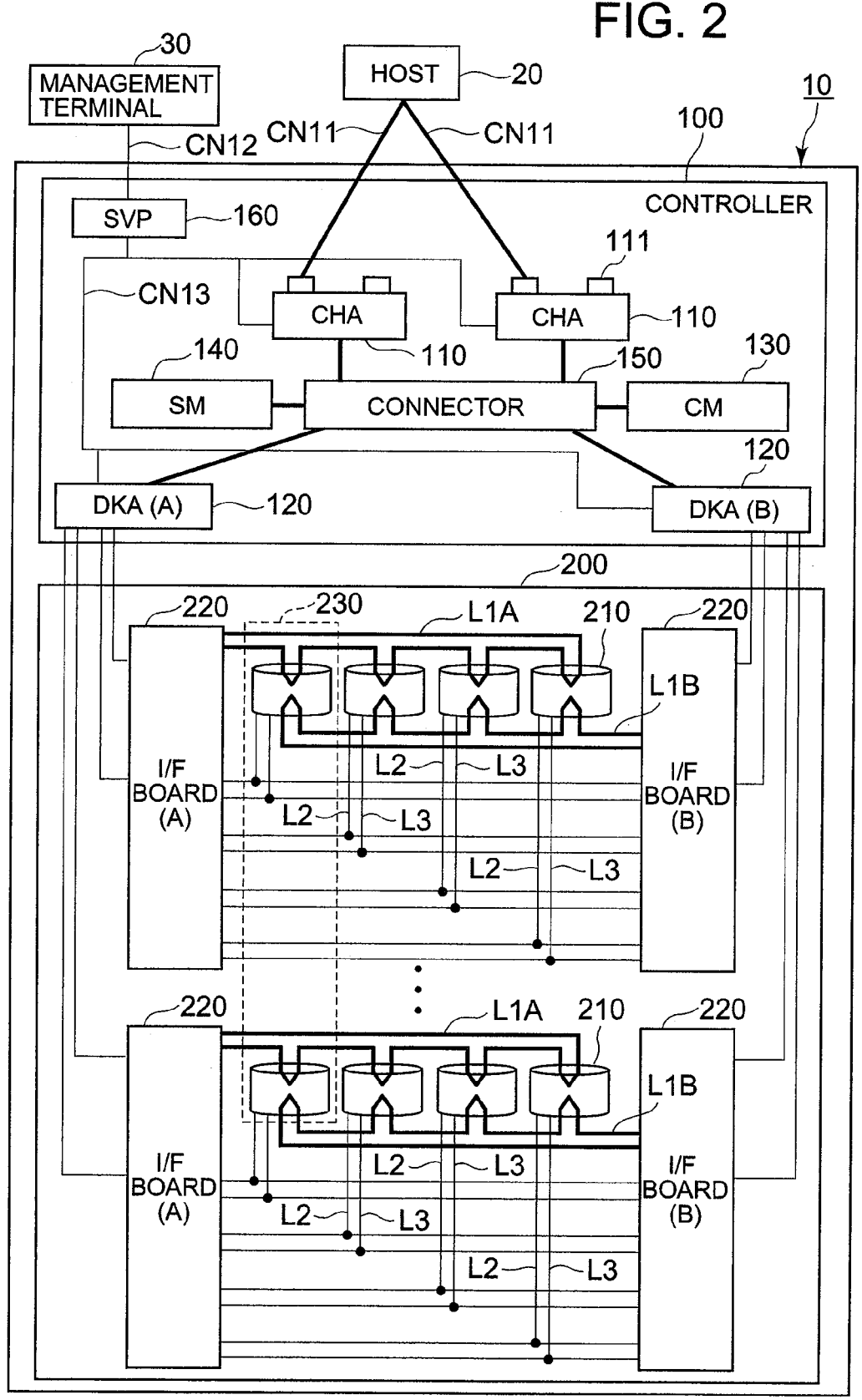
FIG. 2 is a block diagram showing the overall constitution of a storage control system.

FIG. 2 is a schematic diagram showing the overall constitution of a storage control system 10 according to this embodiment. Firstly, the corresponding relationship between the embodiment described in FIG. 1 and this embodiment will be explained. The host H in FIG. 1 corresponds to the host 20 in FIG. 2, the storage control system 1 in FIG. 1 corresponds to the storage control system 10 in FIG. 2, the controller 3 in FIG. 1 corresponds to the controller 100 in FIG. 2, and the storage device 2 in FIG. 1 corresponds to the disk drive 210 in FIG. 2, respectively. The disk control unit 4 in FIG. 1 corresponds to the DKA 120 in FIG. 2, and the I/F control unit 5 in FIG. 1 corresponds to the I/F board 220 in FIG. 2, respectively. The data signal line 6A in FIG. 1 corresponds to the data communication channel L1A in FIG. 2, and the data signal line 6B in FIG. 1 corresponds to the data communication channel L1B in FIG. 2, respectively. The setting signal lines 7, 8 in FIG. 1 correspond to either one or both of the setting signal lines L2, L3 in FIG. 2. The switches SW1, SW2 in FIG. 1 correspond to the switching elements 223 in FIG. 4. The control circuit 2A in FIG. 1 corresponds to the control circuit 211 in FIG. 3.

The storage control system 10 of this embodiment constitutes one part of an information processing system, and this information processing system, for example, can be constituted comprising at least one or more storage control systems 10, and least one or more hosts 20, and at least one or more management terminals 30. This information processing system, for example, is used at a company, university, government organization, or the like. However, it is not limited to this, and can also be utilized inside the home.

A storage control system 10, for example, is connected to a host 20 via a SAN, LAN, the Internet or other such communication channel CN11. A host 20, for example, is constituted as a computer device, such as a server computer, mainframe computer, or workstation. Furthermore, when a host 20 is a mainframe computer, for example, the transfer of data is carried out in accordance with a communication protocol, such as FICON (Fibre Connection: registered trademark), ESCON (Enterprise System Connection: registered trademark), ACONARC (Advanced Connection Architecture: registered trademark), or FIBARC (Fibre Connection Architecture: registered trademark).

A management terminal 30, for example, is connected to a service processor 160 inside a storage control system 10 via a LAN or other such communication channel CN12. A management terminal 30 can monitor the various states inside a storage control system 10, and can display the results of monitoring on the terminal screen. A user can furnish an indication to a storage control system 10 by way of a management terminal 30. In accordance with this indication, the user, for example, can have the storage control system 10 execute the generation of a logical volume, the setting of a connection relationship between a host 20 and a logical volume, and preparations for replacing a malfunctioning component.

The constitution of a storage control system 10 will be explained. A storage control system 10 can be broadly divided into a controller 100 and a storage unit 200. The details of the controller 100 and storage unit 200 will be explained hereinbelow. But first, by way of a brief explanation, the controller 100 is for controlling the operation of the storage control system 10. The storage unit 200 is for housing a plurality (normally a large number) of disk drives 210. The controller 100 and storage unit 200 can be disposed inside the same enclosure, or they can be disposed inside separate enclosures. Further, the storage unit 200 can also be constituted by respectively mounting a plurality of disk drives 210 inside a plurality of enclosures, and connecting the respective enclosures via a fibre channel protocol.

The constitution of the controller 100 will be explained. The controller 100, for example, is constituted comprising at least one or more channel adapters (hereinafter, CHA) 110, at least one or more disk adapters (hereinafter, DKA) 120, at least one or more cache memories (hereinafter, CM) 130, at least one or more shared memories (hereinafter, SM) 140, a connector 150, and a service processor (hereinafter, SVP) 160.

A CHA 110 is for controlling data communications with a host 20, and, for example, is constituted from a computer device comprising a microprocessor and a local memory. The respective CHA 110 comprise at least one or more communication ports 111. For example, identification information, such as an IP (Internet Protocol) address and WWN (World Wide Name), is set in a communication port 111.

A DKA 120 is for controlling data communications with the respective disk drives 210, and the same as a CHA 110, is constituted from a computer device comprising a microprocessor and a local memory.

The respective DKA 120 and disk drives 210 are respectively connected via an I/F board 220. The respective DKA 120 and disk drives 210, for example, carry out data transfer in block units based on the fibre channel protocol. Further, the respective DKA 120 constantly monitor the states of the disk drives 210. The SVP 160 acquires the results of monitoring by a DKA 120 via an internal network CN13.

The CHA 110 and DKA 120, for example, respectively comprise printed circuit boards mounted with processors and memories, and control programs, which are stored in memory, and realize respective prescribed functions via the collaboration of these hardware and software components. CHA 110 and DKA 120, together with a cache memory 130 and a shared memory 140, constitute a controller 100.

The operation of a CHA 110 and a DKA 120 will be explained here. A CHA 110, upon receiving a read command issued from a host 20, stores this read command in shared memory 140. A DKA 120 constantly references the shared memory 140, and upon discovering an unprocessed read command, reads out data from a disk drive 210 and stores same in the cache memory 130. The CHA 110 reads out the data moved to the cache memory 130 and send same to the host 20.

Conversely, upon receiving a write command issued from a host 20, the CHA 110 stores this write command in the shared memory 140. Further, the CHA 110 stores the received write data in the cache memory 130. The CHA 110, after storing the write data in the cache memory 130, reports write-end to the host 20. The DKA 120 reads out the data stored in the cache memory 130 and stores same in a prescribed disk drive 210 in accordance with the write command stored in the shared memory 140.

The cache memory 130, for example, is for storing data and so forth received from a host 20. The cache memory 130, for example, is constituted from a nonvolatile memory. The shared memory (or control memory) 140, for example, is constituted from a nonvolatile memory. Control information, management information and so forth, for example, is stored in the shared memory 140. Control information and other such information can be multiplexed and managed by a plurality of shared memories 140.

Furthermore, a plurality of both shared memories 140 and cache memories 130 can be provided. Further, cache memory 130 and shared memory 140 can be inclusively mounted on the same memory board. Or, one part of memory can be used as a cache area, and another part can be used as a control area.

The connector 150 respectively connects the respective CHA 110, respective DKA 120, cache memory 130 and shared memory 140. Accordingly, all of the CHA 110 and DKA 120 can respectively access the cache memory 130 and the shared memory 140. The connector 150, for example, can be constituted as a crossbar switch.

The SVP 160 is connected to the respective CHA 110 and respective DKA 120 via a LAN or other such internal network CN13. Further, the SVP 160 can be connected to a management terminal 30 via a LAN or other such communications network CN12. The SVP 160 gathers information on various states internal to the storage control system 10, and provides same to a management terminal 30. Furthermore, the SVP 160 can be connected to either one of the CHA 110 or DKA 120 alone. This is because the SVP 160 is capable of gathering various status information via the shared memory 140.

Furthermore, the constitution of the controller 100 is not limited to the above-described constitution. For example, the constitution can also be such that a function for carrying out data communications with a host 20, a function for carrying out data communications with a disk drive 210, a function for temporarily storing data, and a function for rewritably storing control information and the like are respectively provided on either one or a plurality of control boards.

The constitution of the storage unit 200 will be explained. The respective disk drives 210, for example, are realized as hard disk drives, flash memory drives, optical disk drives, magneto-optical disk drives, holographic memories, and so forth. Each disk drive 210, for example, can be constituted comprising a storage medium, a control circuit 211 (refer to FIG. 3) for reading/writing data from/to the storage medium, a cooling mechanism, and a power circuit.

Although it will differ by RAID constitution, for example, a parity group 230 is configured from a prescribed number of disk drives 210, such as three drives per group, or four drives per group. This parity group 230 virtualizes the physical storage areas respectively possessed by the disk drives 210 inside the parity group 230. A logical storage device of either a prescribed size or a variable size can be set in the physical storage area of the parity group 230. This logical storage device is called either a LU (Logical Unit) or a logical volume. The logical storage device is provided to a host 20 by making it correspond to a LUN (Logical Unit Number).

Furthermore, a storage resource utilized by a storage control system 10 need not be provided inside all the storage control systems 10. A storage control system 10 can incorporate and make use of a storage resource that exists outside the storage control system 10 just like one of its own storage resources. For example, when another storage control system exists, the storage control system 10 can be connected to this other storage control system via a SAN or the like, and can utilize external storage resources by connecting a logical storage device of the other storage control system to a virtual device disposed in a substratum of the logical storage device of the storage control system 10.

The storage unit 200 comprises a plurality of I/F boards 220. Each I/F board 220 is respectively connected to a plurality (in FIG. 2, four) disk drives 210. These prescribed numbers of disk drives 210, which are arranged in a horizontal line, are respectively connected to a plurality of I/F boards 220, which differ from one another. As shown in FIG. 2, the horizontally arranged disk drives 210 constitute one management group. The above-mentioned RAID group 230 is constituted so as to span a plurality of management groups. That is, a RAID group 230 can be configured from a plurality of disk drives 210 that belong to respectively different management groups. Furthermore, FIG. 2 shows a situation in which one management group is made up of four disk drives 210, but this is due to space constraints, and the number of disk drives 210 in a management group is not limited to four.

The storage control system 10 comprises a plurality of channels for accessing the respective disk drives 210. One access channel is system A, which is shown in the left side of the figure, and "A" is displayed in the DKA 120 and I/F board 220 belonging to system A. Another access channel is system B, which is shown in the right side of the figure, and "B" is displayed in the DKA 120 and I/F board 220 belonging to system B. The storage control system 10, using any one access channel of the plurality of access channels of either system A or system B, can read/write data from/to the respective disk drives 210, and can carry out settings for the respective disk drives 210. Furthermore, the access channel of system A can be called the "A port", and the access channel of system B can be called the "B port".

Within the respective management groups, the I/F boards 220 and disk drives 210 are respectively connected by a plurality of signal lines L1A, L1B, L2, L3. Data signal line L1A connects the I/F board 220 and disk drives 210 of system A in a daisy chain mode. Similarly, data signal line L1B connects the I/F board 220 and disk drives 210 of system B in a daisy chain mode. Data is inputted/outputted to the respective disk drives 210 via either of these data signal lines L1A, L1B.

The setting signal lines L2, L3 are for setting the operational mode or identification information (hereinafter, identification information may also be called a drive address) in the respective disk drives 210. As will be explained hereinbelow, the setting signal lines L2, L3 are each respectively constituted from a plurality of signal lines L21, L22, L31, L32 (refer to FIG. 3). For the sake of convenience, FIG. 2 simplifies signal lines L2 and L3 by showing them as one line each.

Signal line L2 is for setting the operational modes of the disk drives 210. An operational mode will be explained hereinbelow. Signal line L3 is for setting the drive addresses of the disk drives 210. For example, each disk drive 210 comprises a drive address which uniquely specifies it within the storage control system 10. One part of a drive address is rewritable, and the other part is fixed. The drive address of each disk drive 210 can be changed by using signal line L3 to set the rewritable part.

The signal lines L2, L3 from the respective I/F boards 220 are wired-OR connected. That is, for example, the logical OR of the value of a signal outputted on signal line L2 from the I/F board 220 of system A, and the value of a signal outputted on signal L2 from the I/F board 220 of system B is inputted to the disk drives 210. The same holds true for signal line L3. This will be explained in detail below.

Figure 3:
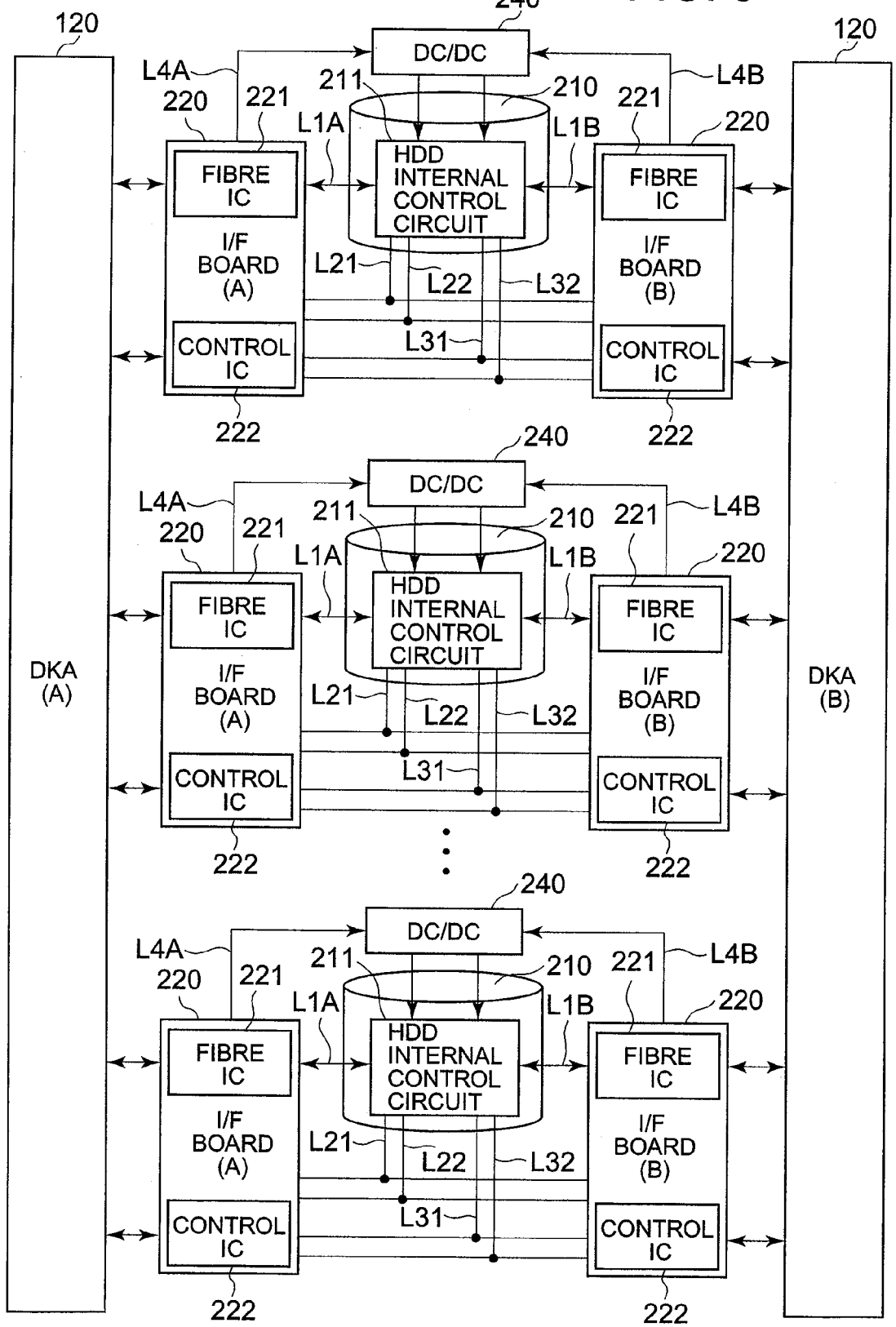
FIG. 3 is a schematic diagram showing a constitution in which DKA are connected to a plurality of disk drives via a plurality of I/F boards.

FIG. 3 is a schematic diagram focusing on the access channels to the respective disk drives 210. For the sake of expediting the explanation, one disk drive 210 each is shown for the respective management groups in FIG. 3. In actuality, as described hereinabove, one group of I/F boards 220, which comprises an I/F board 220 of system A and an I/F board 220 of system B, is in charge of changing the settings of a plurality of disk drives 210.

An example of a power supply structure will be explained. For example, the disk drives 210 each comprise a direct current power unit (displayed as DC/DC in FIG. 3) 240. A direct current power unit 240 converts direct current power inputted from an AC/DC power source (not shown in the figure), which is disposed inside the storage control system 10, to a prescribed direct current voltage, and supplies same to a disk drive 210. A prescribed direct current voltage, for example, can be five volts of direct current, or 12 volts of direct current.

The direct current power units 240 are respectively connected to the I/F board 220 of system A and the I/F board 220 of system B. A direct current power unit 240, upon receiving the indication "power ON" from either one of the I/F boards 220 of the system A I/F board 220 or the system B I/F board 220, supplies direct current power to a disk drive 210. A direct current power unit 240 stops a power supply operation only when power ON indications from the I/F boards 220 of both systems stop.

The respective I/F boards 220, for example, are constituted comprising a circuit 221 for controlling a data transfer, and a circuit 222 for controlling a setting change, such as that for an operational mode or a drive address. The former circuit 221, for example, controls data input/output to the respective disk drives 210 based on the fibre channel protocol. Therefore, in the following explanation, this circuit 221 is called a fibre IC (Integrated Circuit) 221. The latter circuit 222 is a circuit for setting an operational mode or drive address in a disk drive 210. Further, this circuit 222 also controls the operation of the direct current power unit 240. Therefore, in the following explanation, this circuit 222 is called the control IC 222.

The fibre IC 221 of system A is connected to a control circuit 211 inside a disk drive 210 via data signal line L1A. Similarly, the fibre IC 221 of system B is connected to a control circuit 211 inside a disk drive 210 via data signal line L1B.

The setting signal line L2 described above, for example, can be constituted from two signal lines L21 and L22 as shown in FIG. 3. Similarly, the setting signal line L3 described above, for example, can also be constituted from two signal lines L31 and L32. These respective signal lines L21, L22 and L31, L32 are connected to control IC 222 of system A and control IC 222 of system B, respectively. Further, the control IC 222 of system A is connected to the direct current unit 240 via a power control signal line L4A, and, similarly, the control IC 222 of system B is connected to the direct current unit 240 via a power control signal line L4B.

Figure 4:
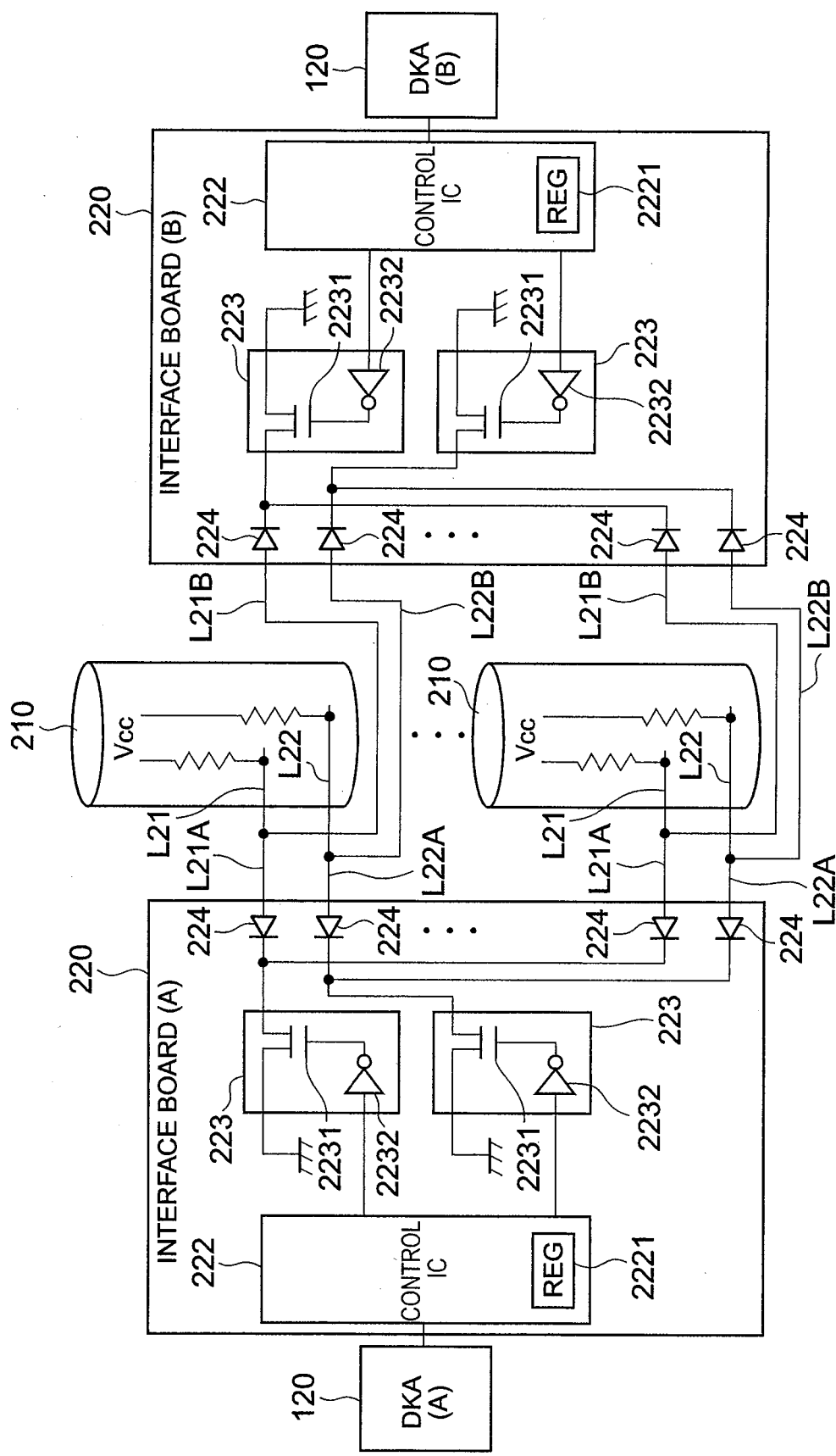
FIG. 4 is a circuit diagram focusing on the relationship between disk drives and I/F boards.

FIG. 4 is a circuit diagram showing details of a portion of the constitution of the respective I/F boards 220. In FIG. 4, the constitution of the direct current power unit 240 is omitted. Further, in FIG. 4, the focus is on the control IC 222, and the constitution of the fibre IC 221 is omitted.

The respective I/F boards 220 comprise a plurality of switches 223. The switches 223, for example, are constituted as analog switches, which comprise a transistor 2231, and an inverting element (a NOT gate) 2232. An element for realizing this kind of switch 223, for example, is known as model SN74BCT1G125.

The collector of the transistor 2231 is connected to either setting signal line L21A or L22A via a diode 224 for preventing counterflow. The collector of the transistor 2231 shown in the top portion of FIG. 4 is connected to setting signal line L21A by way of diode 224, and the collector of the transistor 2231 shown in the bottom portion of FIG. 4 is connected to another setting signal line L22A by way of another diode 224.

Of the above-described setting signal lines L21 for setting an operational mode, setting signal lines L21A and L22A are signal lines, which are connected to system A. One system A setting signal line L21A is wired-OR connected to a setting signal line L21B of system B, and connected a disk drive 210. The other one setting signal line L22A is wired-OR connected to setting signal line L22B of system B and connected to a disk drive 210. Then, setting signal lines L21 and L22 are respectively pulled up to the power voltage Vcc inside the disk drive 210.

The gate of the transistor 2231 is connected to the control IC 222 via an inverting element 2232. The emitter of the transistor 2231 is grounded. As a result of a switch 223 being constituted like this, when the setting signal inputted to the inverting element 2232 from the control IC 222 is a low-voltage state (L), the switch 223 opens the collector-emitter circuit and outputs an open state signal. An open state signal is a signal value of a state in which the signal line seems to be disconnected part way along, that is, it is a signal of a high impedance state.

By contrast, when the setting signal inputted to the inverting element 2232 from the control IC 222 is a high-voltage state (H), the switch 223 closes the collector-emitter circuit and outputs a low-voltage state signal. Low voltage in this case is ground potential. In the following explanation, a signal outputted from the switch 223 will be called a control signal. As explained hereinabove, the signal value of a control signal changes in accordance with the value of the setting signal inputted to the switch 223 from the control IC 222.

The constitution of switch 223 is not limited to the above-described constitution, and, for example, the switch 223 can also be constituted from a relay or the like. The switch 223 can be constituted so as to enable an open state signal value to be outputted when a failure occurs in an I/F board 220 rendering it inoperable.

The control IC 222 comprises a register 2221. The register 2221 holds a signal inputted from the DKA 120. The control IC 222 outputs to the switch 223 a setting signal of either an H or L value based on the value stored in the register 2221. The register 2221 comprises bits corresponding to the respective switches 223. That is, in this embodiment, the output states of the two switches 223 are controlled on the basis of a two-bit signal inputted from the DKA 120.

The system B I/F board 220 is constituted the same as the above-described system A I/F board 220. Therefore, an explanation of the system B I/F board 220 will be omitted. Furthermore, in FIG. 4, the focus is on a constitution for simultaneously setting the respective operational modes of disk drives 210 in a management group. In FIG. 4, a constitution related to setting a drive address is omitted. The constitution for setting a drive address is the same as the above-described constitution for setting an operational mode.

Figure 5:
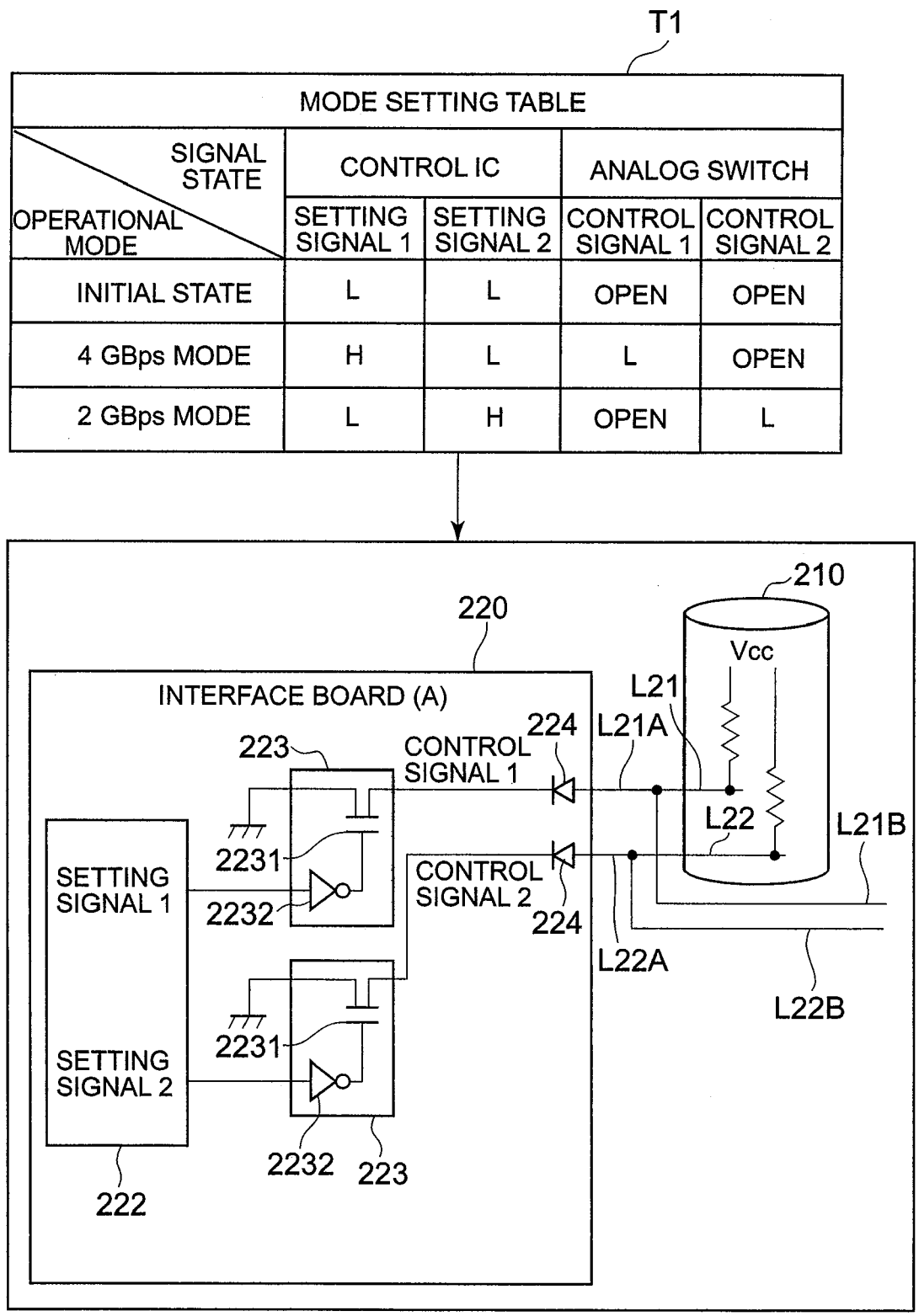
FIG. 5 is a schematic diagram showing the relationship between a mode setting table and a switch.

FIG. 5 is a schematic diagram showing a constitution for changing a control signal outputted from the respective switches 223 of an I/F board 220. In this embodiment, a mode setting table T1 is provided beforehand. The mode setting table T1, for example, correspondingly manages a plurality of operational modes, a setting signal outputted from the control IC 222, and control signals outputted from the switches 223.

Operational modes, for example, can include a 4 GBPS mode, which is a high-speed transfer mode, and a 2 GBPS mode, which is a low-speed transfer mode. Besides these, an operational mode initial state is also provided.

In the case of the initial state, the two setting signals outputted from the control IC 222 are both set to L. When setting signal 1 is set to L, the switch 223 into which this setting signal 1 is inputted outputs an open state control signal. Similarly, when setting signal 2 is set to L, the switch 223 into which this setting signal 2 is inputted also outputs an open state control signal.

In the case of the high-speed transfer mode, setting signal 1 is set to H, and setting signal 2 is set to L. Accordingly, control signal 1 becomes L, and control signal 2 becomes an open state. In the case of the low-speed transfer mode, setting signal 1 is set to L and setting signal 2 is set to H. Accordingly, control signal 1 becomes an open state, and control signal 2 becomes L.

When an open state control signal and a low-voltage state (L) control signal contend for the same signal line, either L21 or L22, the signal value generated on this signal line becomes L. In other words, only when both control signal 1 and control signal 2 are in the open state is an open state control signal inputted to a disk drive 210.

Figure 6:
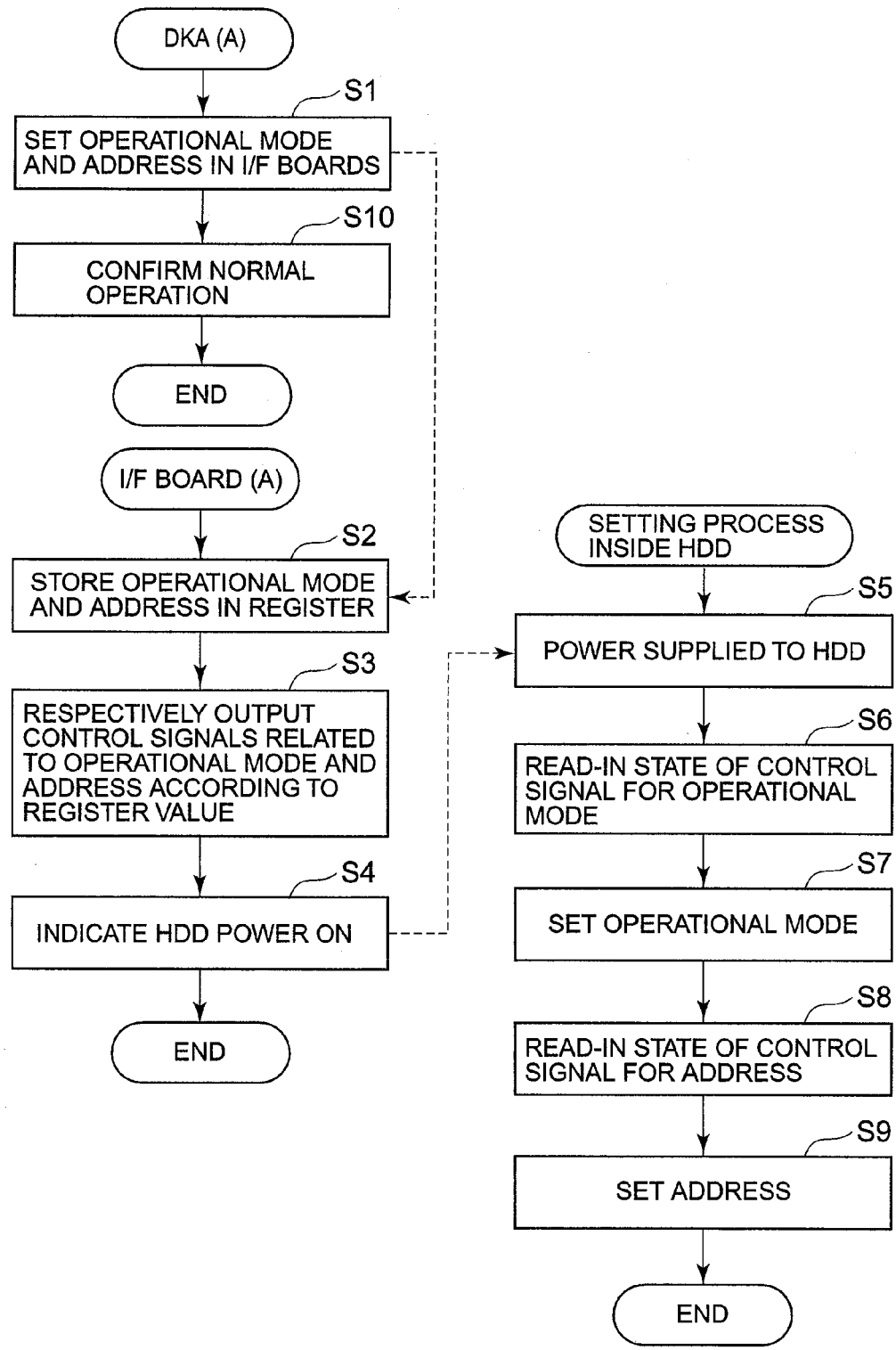
FIG. 6 is a flowchart showing the process for setting the operational mode in a disk drive at storage control system ramp-up.

The operation of the storage control system 10 according to this embodiment will be explained based on FIGS. 6 through 10. FIG. 6 is a flowchart of when an operational mode and drive address are respectively set in the disk drives 210 at storage control system 10 ramp-up (initial setting time).

Furthermore, the respective flowcharts shown below depict overviews of processing within a scope necessary to understand and implement the present invention, and processing performed by an actual computer program may differ. A person with an ordinary skill in the art should be able to replace the steps inside the flowcharts shown in the figures with other steps, and change the sequence of the steps.

As described hereinabove, the storage control system 10 comprises two channels, system A and system B, as channels for accessing the respective disk drives 210. Normally, the storage control system 10 utilizes either one of the access channels of either system A or system B, to set an operational mode and drive address in the respective disk drives 210. In this embodiment, an example of when system A is used as the primary channel will be explained.

The DKA 120 of system A sets an operational mode and drive address in the respective I/F boards 220 (S1). The I/F boards 220 of system A respectively store indications received from the DKA 120 in the register 2221 (S2). An indication related to an operational mode is stored in a register 2221 for storing an operational mode, and an indication related to a drive address is stored in a register for storing a drive address.

The I/F boards 220 of system A respectively output control signals from the switches 223 in accordance with a value stored in the register (S3). Accordingly, signal values for realizing an operational mode requested from the DKA 120 are respectively generated on the signal lines L21, L22. Furthermore, prior to commencing S3, the signal values of the signal lines L21, L22 respectively transition to the open state.

Subsequent to outputting a prescribed signal value over the signal lines L21, L22, the I/F boards 220 issue an indication for the direct current power unit 240 to supply power (S4). The direct current power unit 240, upon receiving a power ON indication from the system A I/F board 220, supplies power to a disk drive 210. Consequently, direct current power, such as five volts of direct current and 12 volts of direct current, for example, is supplied to a disk drive 210 (HDD in the figure) (S5).

The control circuit 211 inside the disk drive 210, upon direct current power being supplied from the direct current power unit 240, respectively acquires the signal values for the signal lines L21, L22 (S6). The control circuit 211 sets an operational mode in accordance with the state of the combination of signal values, as shown in the mode setting table T1 (S7).

Similarly, the control circuit 211 respectively acquires the signal values of signal lines L31, L32 (S8), and sets a drive address (S9) in accordance with the combination of these signal values. That is, immediately after startup, the control circuit 211 reads in the signal values of the respective signal lines L21, L22, L31, L32, and sets an operational mode and drive address. The constitution is such that once set, the operational mode and drive address do not change even when the signal values of the signal lines L21, L22, L31, L32 change.

Details of the setting method of a drive address will be omitted, but a drive address can be set the same as an operational mode. In the case of a drive address as well, a situation in which the signal values of signal lines L31, L32 are both in the open state is treated as an initial state. An address value can be made correspondent to a combination other than the combination of signal values of the initial state.

Finally, the DKA 120 confirms that an operational mode and drive address has been set for each disk drive 210, and ends the initial ramp-up setting process (S10).

Figure 7:
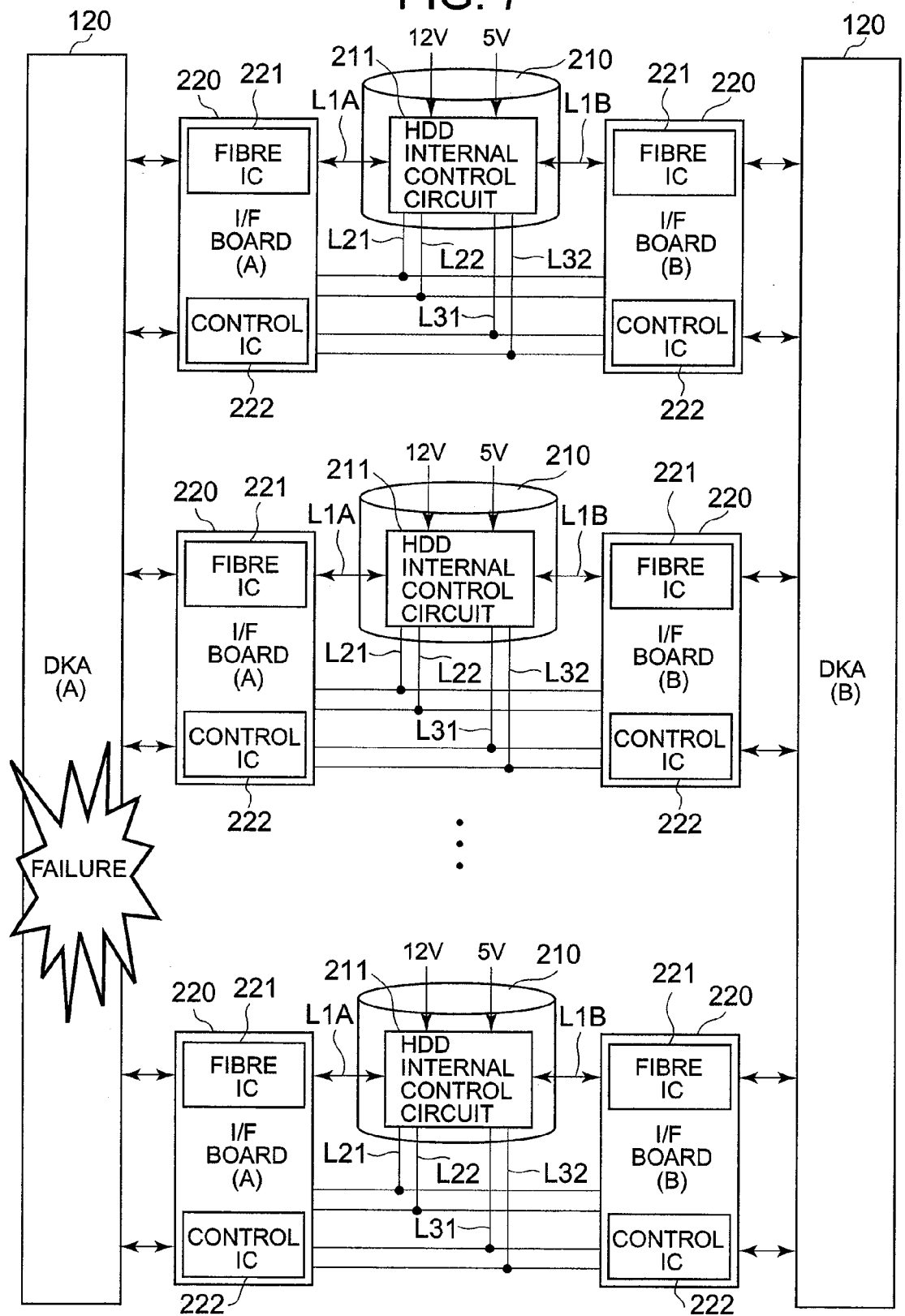
FIG. 7 is a schematic diagram showing a situation in which a failure occurs in a DKA of the one access channel.

FIG. 7 is a schematic diagram showing a situation in which a failure occurs when initial settings are being carried out in the storage control system 10. A storage control system 10 and the respective replacement parts that constitute the storage control system 10 are inspected prior to being shipped from the plant to make sure they are operating normally. Therefore, in most cases, the initial settings of a storage control system 10 are carried out normally without any problems. However, a failure may occur for one reason or another. FIG. 7 shows a situation in which a failure has occurred in the DKA 120 of system A (that is, the primary system), which is normally used.

Figure 8:
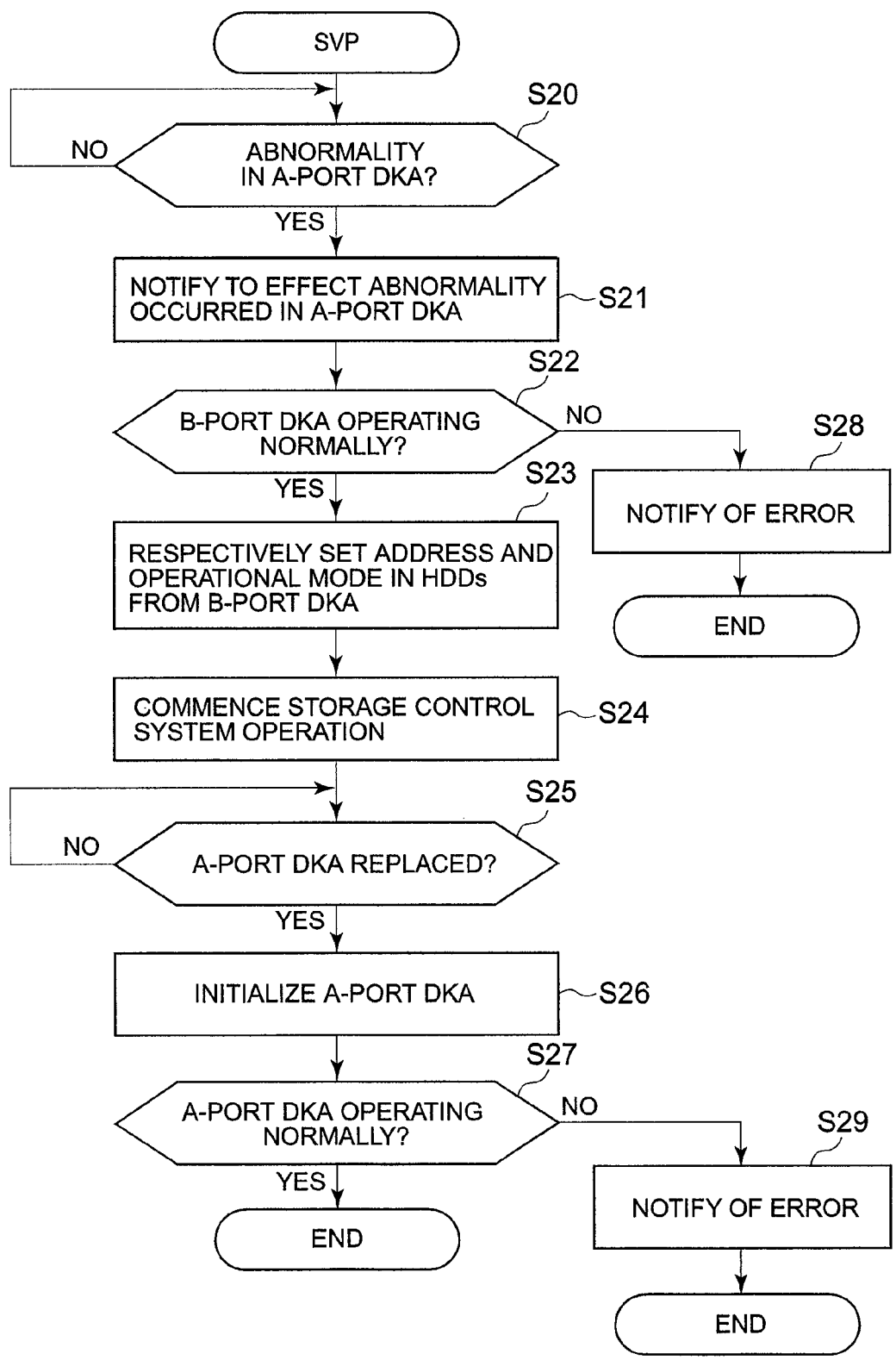
FIG. 8 is a flowchart showing the process for setting up a disk drive from the other access channel when a failure occurs in a DKA of the one access channel.

FIG. 8 is a flowchart showing the process for setting an operational mode and so forth in the disk drives 210 under circumstances in which a failure has occurred in the system A DKA 120. The SVP 160 constantly monitors the respective parts inside the storage control system 10 to determine whether or not a failure has occurred. When a failure occurs in the DKA 120 of system A (described as the A port in the figure), the SVP 160 detects this failure (S20: YES).

The SVP 160, for example, outputs a display to the screen of the management terminal 30 notifying the user to the effect that a failure has occurred in the system A DKA 120 (S21). Or, the constitution can also be such that an e-mail message giving notice of the occurrence of a failure is sent to a pre-registered e-mail address.

The SVP 160 determines whether or not the DKA 120 of system B (described as the B port in the figure) is operating normally (S22). If a failure also occurs in the DKA 120 of system B at storage control system 10 ramp-up (S22: NO), this makes it impossible to set an operational mode or the like in the respective disk drives 210, and therefore the SVP 160 notifies the management terminal 30 of an error (S28) and ends this processing. This is because neither the system A nor system B access channels can be utilized. However, it is extremely unlikely that a failure would occur simultaneously in both system A and system B.

When it is determined that the system B DKA 120 is operating normally (S22: YES), the SVP 160 uses the system B DKA 120 to set the operational modes and drive addresses in the respective disk drives 210 (S23).

As explained with regard to the mode setting table T1, in the initial state, the signal values of the respective setting signal lines L21, L22 both constitute the open state. The switches 223 of the respective I/F boards 220 are constituted as analog switches, which are in the open state when a signal is not inputted. Therefore, if there is a failure in the system A DKA 120, the signal values of the respective signal lines L21, L22 will both be in the open state. Accordingly, the operational modes of the disk drives 210 can be set by outputting the prescribed control signals from the respective I/F boards 220 of system B in accordance with indications from the system B DKA 120.

This will be explained more specifically. For example, when setting the high-speed transfer mode, only control signal 1 outputted from the respective I/F boards 220 of system B needs to be set to the low-voltage state. Thus, the signal value of signal line L21 generated by control signal 1 becomes the low-voltage state. Conversely, the signal value of signal line L22 generated by control signal 2 remains as-is in the open state. Therefore, the operational mode of a disk drive 210 is set to the high-speed transfer mode. Similarly, when setting the low-speed transfer mode, only control signal 2 outputted from the respective I/F boards 220 of system B needs to be set to the low-voltage state. Thus, the signal value of signal line L22 generated by control signal 2 becomes the low-voltage state. Conversely, the signal value of signal line L21 generated by control signal 1 remains as-is in the open state. Therefore, the operational mode of a disk drive 210 is set to the low-speed transfer mode.

Thus, even when a failure occurs in the DKA 120 of the primary system (system A), it is possible to set the operational modes and so forth in the respective disk drives 210 using the DKA 120 of the backup system (system B). Consequently, normal operation of the storage control system 10 can be commenced (S24). However, because the DKA 120 of system A remains down, the redundant constitution of the access channels to the respective disk drives 210 is lost.

Accordingly, the SVP 160 determines whether or not the malfunctioning system A DKA 120 has been replaced with a normal DKA 120 (S25). In accordance with the notification of S21, a user replaces the malfunctioning DKA 120 with a replacement DKA 120 prepared in advance.

When the malfunctioning DKA 120 has been replaced with a normal DKA 120 (S25: YES), the SVP 160 initializes the DKA 120 that has been substituted (S26). The SVP 160, subsequent to ascertaining whether or not the substituted DKA 120 is operating normally (S27: YES), ends this processing. Consequently, a plurality of access channels, system A and system B, are constructed inside the storage control system 10, achieving a redundant constitution.

In the unlikely event that the DKA 120 substituted in S25 does not operate normally (S27: NO), the SVP 160 notifies the management terminal 30 of an error (S29). In this case, the user replaces the DKA 120 substituted in S25 with another DKA 120. The likelihood of such a situation occurring is extremely rare.

Figure 9:
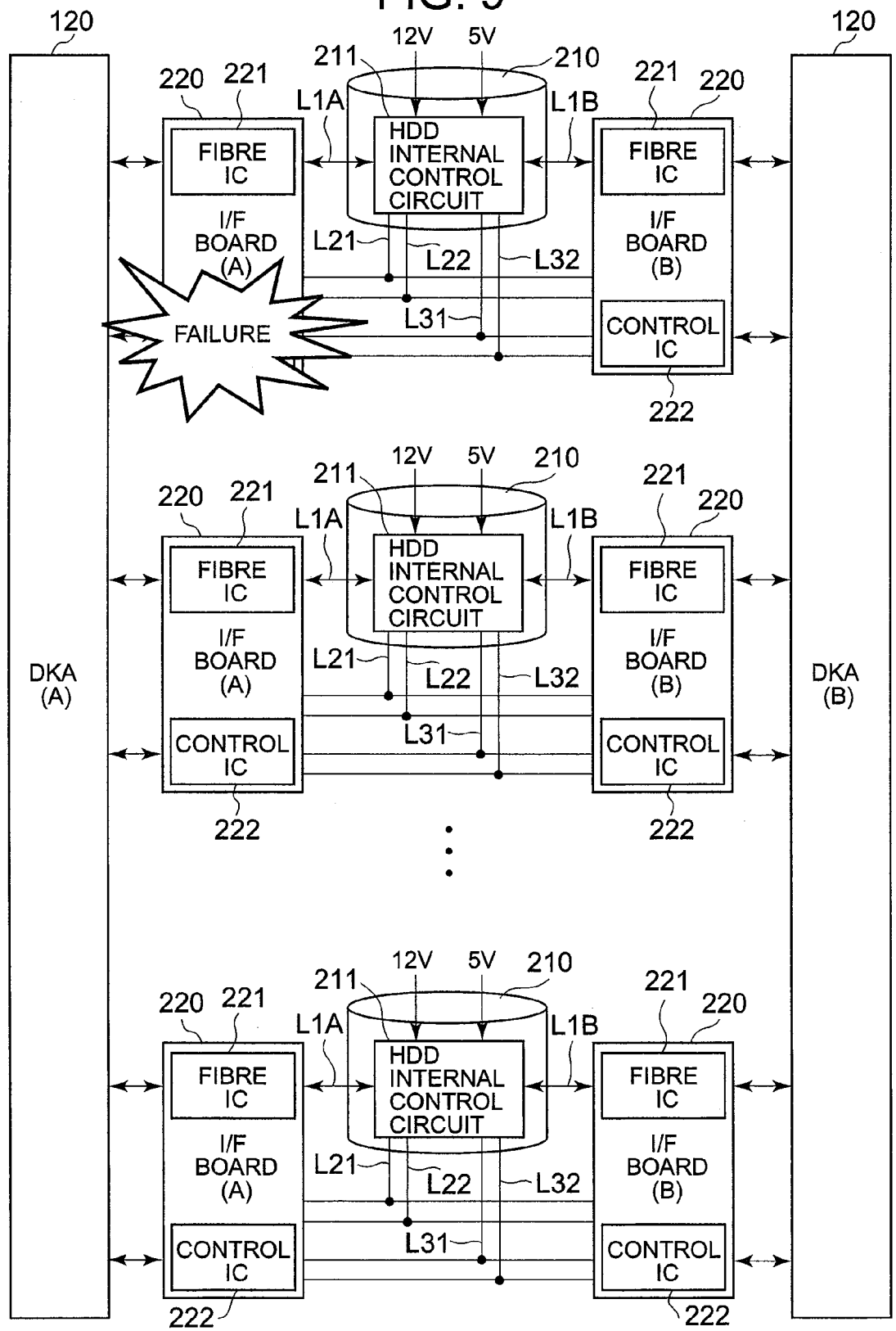
FIG. 9 is a schematic diagram showing the situation when a failure occurs in an I/F board of the one access channel.
Figure 10:
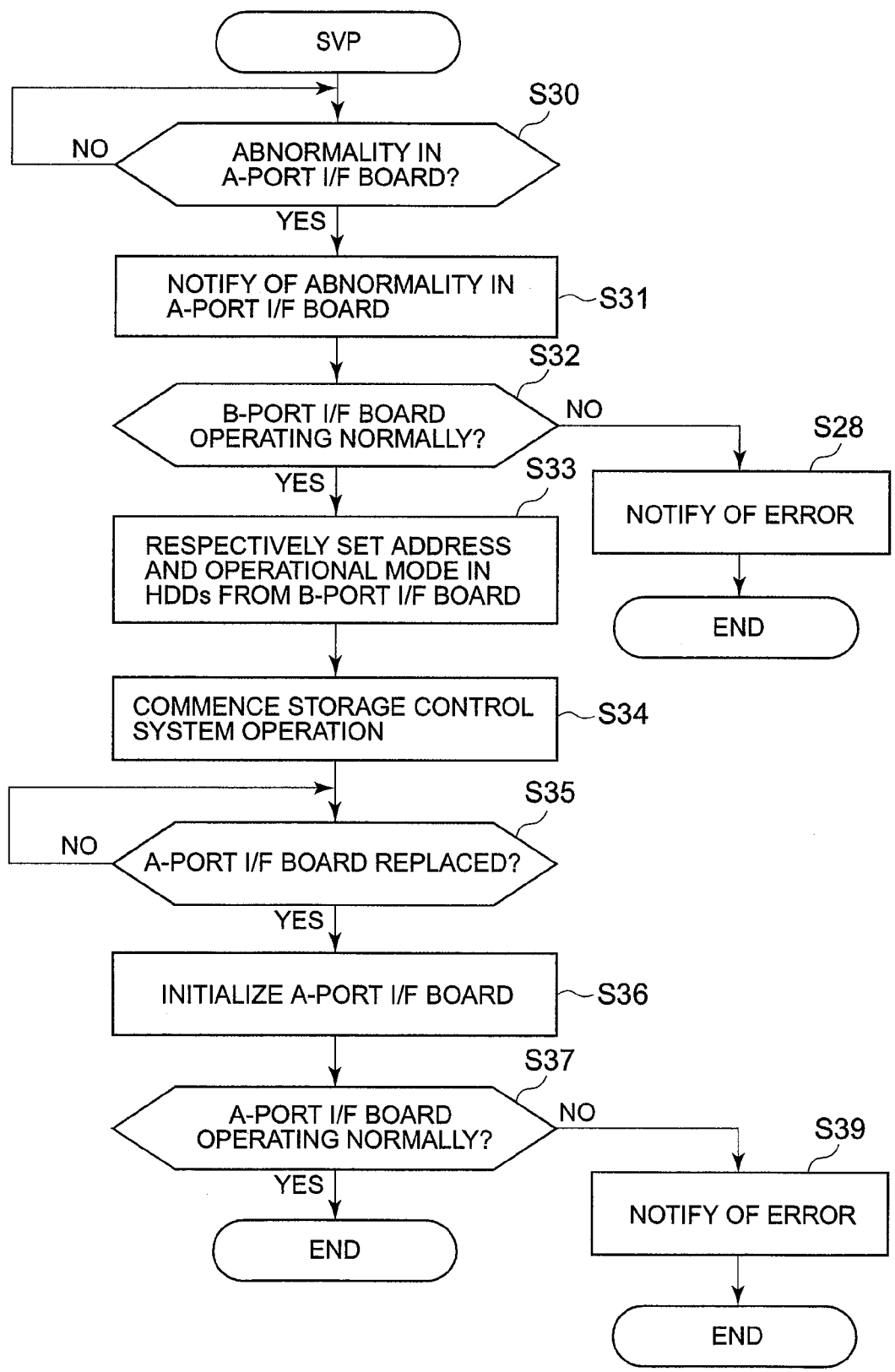
FIG. 10 is a flowchart showing the process for setting up a disk drive from the other access channel when a failure occurs in an I/F board of the one access channel.

FIG. 9 is a schematic diagram showing a situation in which a failure occurs in either one of the I/F boards 220 of system A at initial ramp-up of the storage control system 10. FIG. 10 is a flowchart showing the process for setting an operational mode and so forth in the respective disk drives 210 under circumstances in which a failure has occurred in either of the I/F boards 220 of system A.

As described in FIG. 8, the SVP 160 constantly monitors whether or not a failure has occurred in the respective parts of the storage control system 10. Therefore, when a failure occurs in an I/F board 220 of system A, the SVP 160 detects this failure (S30: YES).

The SVP 160 notifies the user by outputting a display to the screen of the management terminal 30 to the effect that a failure has occurred in an I/F board 220 of system A (S31). The SVP 160 determines whether or not the I/F board 220 of system B corresponding to the I/F board 220 in which the failure occurred is operating normally (S32). That is, the SVP 160 determines whether or not the other I/F board 220 (in this case, the system B I/F board 220), which is in charge of the same management group as the failed I/F board 220, is operating normally. Furthermore, if a failure has also occurred in the system B I/F board 220 (S32: NO), the SVP 160 notifies the management terminal 30 of the error (S38) and ends this processing.

When it is determined that the system B I/F board 220 is operating normally (S32: YES), the SVP 160 uses the I/F board 220 of system B to set the operational modes and drive addresses in the respective disk drives 210 (S33). As described in FIG. 8, even when a failure occurs in an I/F board 220 of the primary system, it is possible to set the operational modes and so forth in the respective disk drives 210 using an I/F board 220 of the backup system, enabling normal operation of the storage control system 10 to commence (S34).

Subsequent to operation startup, the SVP 160 determines whether or not the malfunctioning system A I/F board 220 has been replaced with a normal I/F board 220 (S35). In accordance with the notification of S31, the user replaces the malfunctioning I/F board 220 with a replacement I/F board 220 prepared in advance.

When the malfunctioning I/F board 220 has been replaced with a normal I/F board 220 (S35: YES), the SVP 160 initializes the I/F board 220 that has been substituted (S36). The SVP 160, subsequent to ascertaining whether or not the substituted I/F board 220 is operating normally (S37: YES), ends this processing. In the unlikely event that the I/F board 220 substituted in S35 does not operate normally (S37: NO), the SVP 160 notifies the management terminal 30 of an error (S39).

Being constituted as described hereinabove, this embodiment exhibits the following effect. In this embodiment, it is possible to set operational modes and so forth in the respective disk drives 210 using either one of the channels of a plurality of channels, system A and system B.

In this embodiment, the constitution is such that, in order to change the setting of an operational mode and so forth (in this embodiment, an operational mode and drive address are combined and referred to generically as an operational mode and so forth), which are targeted for setting, a setting signal of a plurality of bits is used, and the initial values of signals outputted from analog switches 223 corresponding to the respective setting signals are respectively set to the open state, and in addition, the constitution is such that an I/F board 220 of system A is wired-OR connected to an I/F board 220 of system B. For this reason, even if an abnormality of some sort should occur in either of a DKA 120 or an I/F board 220, only an open state signal is outputted from the system in which this failure occurred. Therefore, a desired operational mode can be set simply by outputting a low-voltage state signal from the normal side system.

As a result of this, according to this embodiment, even if a failure should occur in a channel (system A or system B) for accessing the respective disk drives 210, this failure can be overcome, and settings can be performed in the respective disk drives 210, thereby suppressing the adverse affects of the failure. Therefore, a storage control system 10 of this embodiment can provide enhanced failure resistance and reliability, thereby enhancing user usability.

In this embodiment, as described hereinabove, settings for the respective disk drives 210 can be carried out by simply using either one of the access channels of the plurality of access channels prepared beforehand (system A and system B). That is, in this embodiment, there is no need to match control signal 1 and control signal 2, which are respectively outputted from both the system A access channel and the system B access channel. This is because the initial values of the control signals outputted over the signal lines from the respective access channels are in the open state, and it is possible to change the signal values generated on these signal lines by simply outputting a low-voltage state control signal from either one of the access channels.

Further, in this embodiment, since it is not necessary to match the values of control signals respectively outputted over the signal lines from the respective access channels, it is also not necessary to match the timing for supplying direct current power to a disk drive 210.

The constitution of the control circuit 211 inside a disk drive 210 is such that it reads in the signal values from the respective signal lines when direct current power is supplied to the disk drive 210 to start it up, and the direct current power unit 240 is constituted so as to supply direct current power to the disk drive 210 upon receiving a power ON indication from either one of the corresponding I/F boards 220. Therefore, the storage control system 10 is capable of setting an operational mode and so forth in a disk drive 210 by simply outputting a control signal corresponding to the desired operational mode and so forth via the access channel of either one of system A or system B.

In this embodiment, the operational mode is explained by giving two transfer modes, a high-speed transfer mode and a low-speed transfer mode, as examples, but the present invention is not limited to this, and a large variety of other operational modes can also be set. For example, it is possible to support even greater numbers of operational modes by making the indications from a DKA 120 to the respective I/F boards 220 three bits, and mounting switches 223 corresponding to these respective bits on the I/F boards 220.

Second Embodiment

A second embodiment will be explained based on FIGS. 11 and 12. The following embodiments, to include this embodiment, are equivalent to variations of the first embodiment described hereinabove. In this embodiment, there is proposed a method for changing the settings of the respective disk drives 210 subsequent to commencement of storage control system 10 operation. In this embodiment, even if a failure occurs in the DKA 120 of system A when changing the settings of a disk drive 210 after the storage control system 10 has commenced operation, the settings of the disk drive 210 can be changed using the DKA 120 of system B. In this embodiment, the above-described effect is achieved by the failed DKA 120 notifying the respective I/F boards 220 under control of the DKA 120 of the occurrence of a failure, and initializing the respective control signals outputted from these I/F boards 220.

Figure 11:
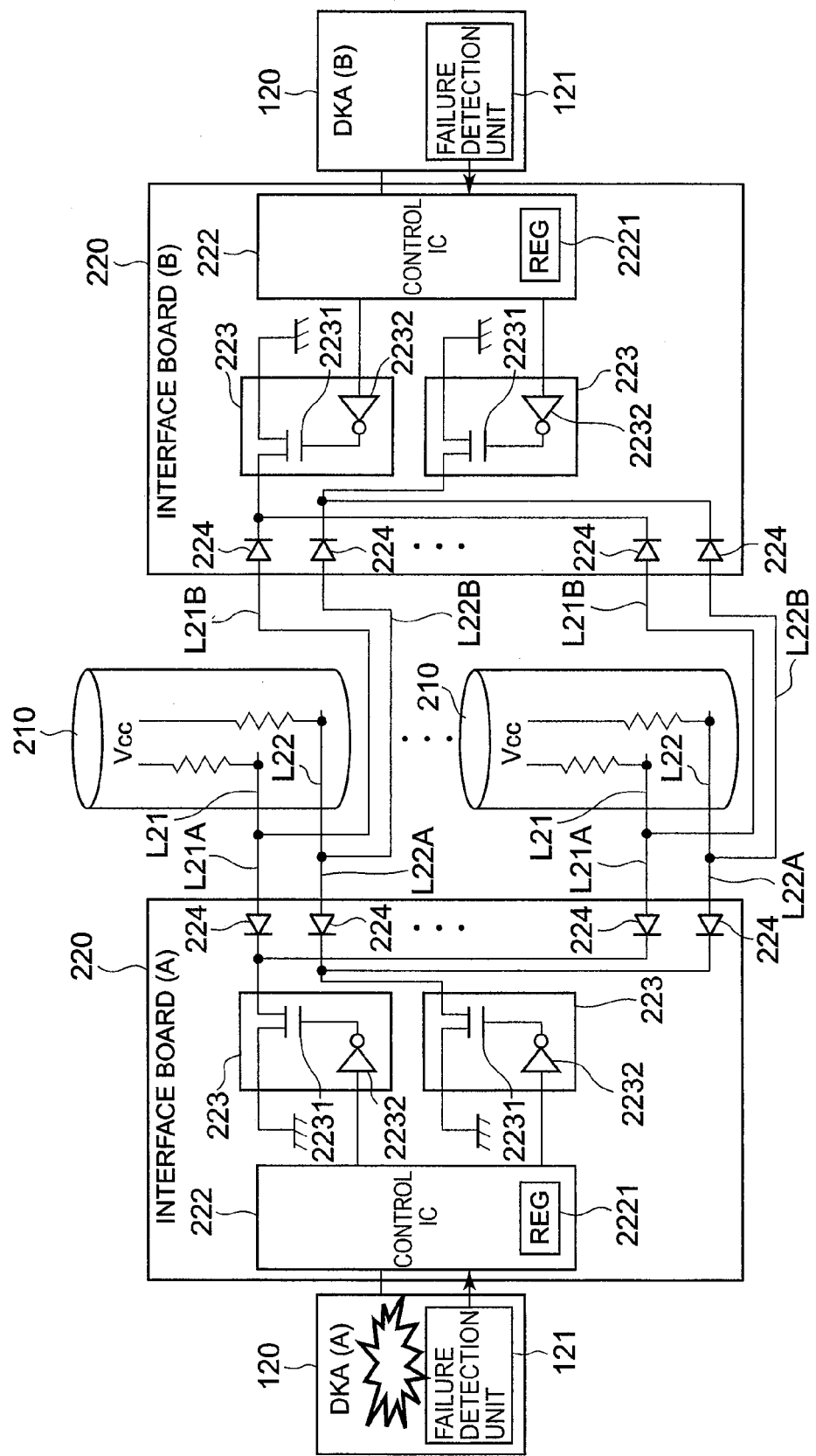
FIG. 11 is a circuit diagram showing a feature of the constitution of a storage control system related to a second embodiment.

FIG. 11 is a schematic diagram showing a feature of the storage control system 10 according to this embodiment. In this embodiment, a failure notification unit 121 is provided inside each DKA 120. When a failure occurs inside the DKA 120, the failure notification unit 121 provides an indication to the control IC 222 and initializes setting signal 1 and setting signal 2 outputted from the control IC 222.

Figure 12:
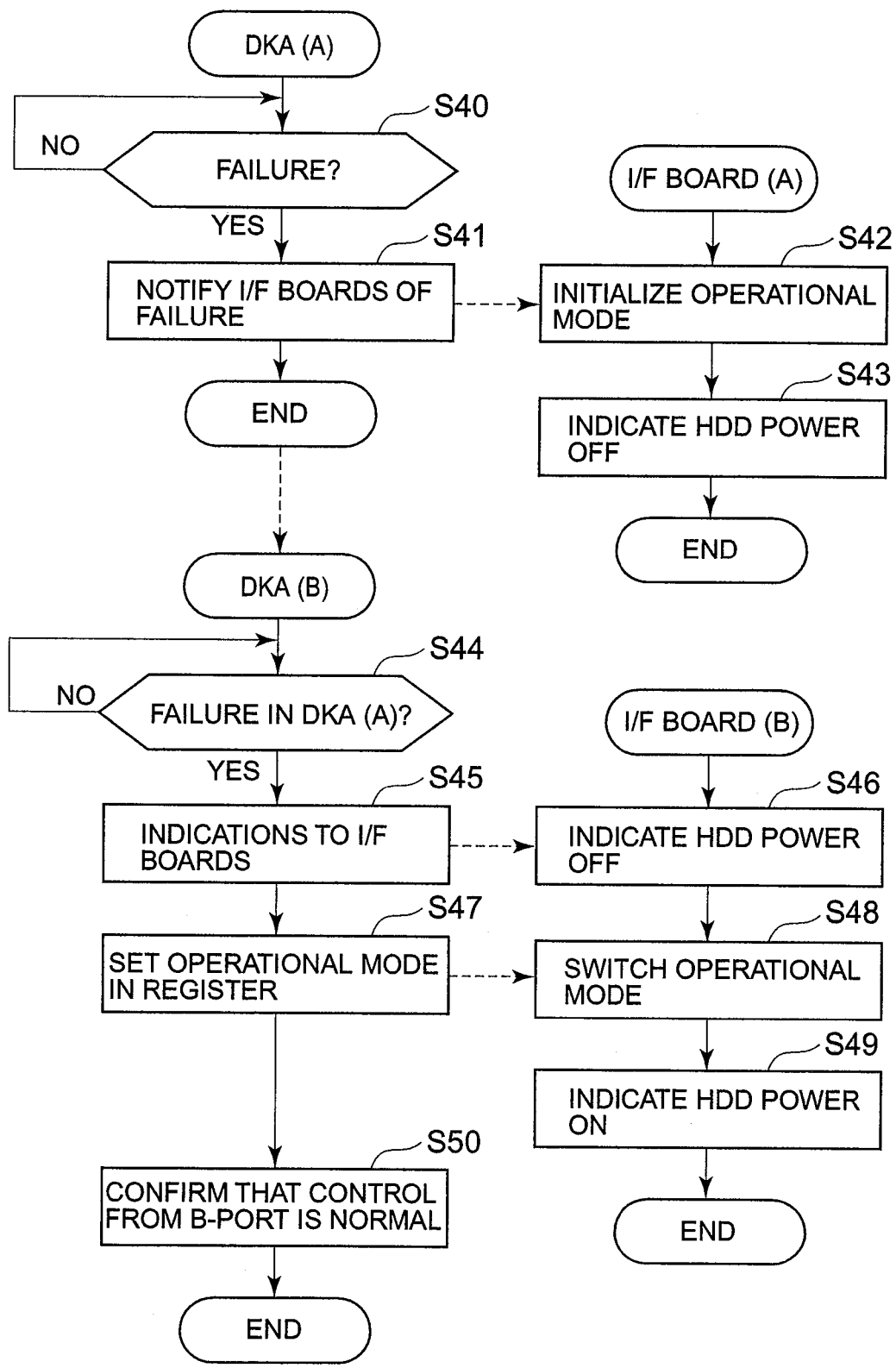
FIG. 12 is a flowchart showing the process for setting up a disk drive from the other access channel when a failure occurs along the one access channel.

FIG. 12 is a flowchart showing the process for changing a setting after operation has commenced in accordance with this embodiment. The DKA 120 of the normally used primary channel (system A DKA 120) monitors itself to determine whether or not a failure has occurred (S40). When a failure is detected (S40: YES), the DKA 120 notifies the respective I/F boards 220 under its control of the failure (S41). This failure notification signifies the initialization of an operational mode, that is, it signifies the initialization of the control signals respectively outputted from the I/F boards 220 under the control of the DKA 120.

The respective I/F boards 220 of system A, upon receiving the notification of S41 from the failure notification unit 121 inside the DKA 120, output control signals for initializing the operational mode of the disk drive 210. That is, the respective I/F boards 220 that receive a notification from the DKA 120 change the signal value of the respective control signals to the open state (S42). Next, the I/F boards 220 issue an indication to the direct current power unit 240 to turn the power OFF (S43). More specifically, the I/F boards 220 stop the power ON indication, which they were providing to the direct current power unit 240. However, because a power ON indication is being provided to the direct current power unit 240 from an I/F board 220 of system B at S43, the power supply to the disk drive 210 continues.

Meanwhile, the DKA 120 of system B, for example, recognizes via the SVP 160 that a failure has occurred in the DKA 120 of system A (S44: YES). The DKA 120 of system B provides indications for changing the operational mode to the respective I/F boards 220, which are under the control of the DKA 120 of system B (S45).

The respective I/F boards 220 of system B, upon receiving the indication of S45, issue an indication to the direct current power unit 240 to turn the power OFF (S46). That is, the I/F boards 220' stop the power ON indication being given to the direct current power unit 240. Consequently, the direct current power unit 240 stops the supply of direct current power, and the disk drive 210 stops.

The DKA 120 of system B respectively issues indicates the desired operational mode to the I/F boards 220 of system B (S47). That is, the DKA 120 of system B respectively sets bits for setting a new operational mode in the registers 2221 of the I/F boards 220 of system B.

Based on the values in the registers 2221, the I/F boards 220 of system B respectively output setting signal 1 and setting signal 2 from the control ICs 222. Accordingly, the switches 223 respectively output control signal 1 and control signal 2 corresponding to the values of the registers 2221 (S48).

In S42, control signal 1 and control signal 2, which were outputted from the I/F boards 220 of system A, were both set to the open state. Therefore, in S48, the respective disk drives 210 can be set to the desired operational mode of the storage control system 10 by the I/F boards 220 of system B simply setting the signal value of the control signal of either one of control signal 1 or control signal 2 to a low-voltage state. However, because the energy to the disk drives 210 for the direct current power unit 240 is stopped at the point in time of S48, the operational modes of the respective disk drives 210 is not changed. More accurately, preparations for changing the operational mode are completed in S48.

Next, the I/F boards 220 of system B supply direct current power to the disk drives 210 from the direct current power unit 240 by furnishing a power ON indication to the direct current power unit 240, starting up the disk drives 210 (S49). Consequently, the control circuits 211 inside the respective disk drives 210 read in the signal values of the signal lines L21, L22, and set the operational mode in accordance with the combination of these signal values.

Finally, the DKA 120 of system B confirms that the system B access channel is operating normally, and ends this processing (S50). Furthermore, although omitted from the figure, the user replaces the malfunctioning DKA 120 of system A with a normal DKA 120.

Being constituted as described hereinabove, this embodiment also exhibits the same effect as the above-described first embodiment. Additionally, in this embodiment, subsequent to the storage control system 10 commencing operation, it is possible to change the settings of the respective disk drives 210 by using either one of the access channels (either system A or system B), thereby enhancing usability.

In this embodiment, even if a failure should occur in system A subsequent to the commencement of storage control system 10 operation, the setting of a disk drive 210 can be changed using system B, thereby enhancing failure resistance and reliability.

Furthermore, in the above-described first embodiment, the focus is on setting the respective disk drives 210 when the storage control system 10 initially ramps up, and in this embodiment, the focus is on changing the settings of the respective disk drives 210 after the storage control system 10 has commenced operation. Therefore, by combining the constitution of the first embodiment with the constitution of the second embodiment it is possible to further enhance the failure resistance, reliability and usability of the storage control system 10.

Third Embodiment

A third embodiment will be explained based on FIGS. 13 and 14. This embodiment proposes a method for changing the settings of the respective disk drives 210 subsequent to the commencement of storage control system 10 operation the same as the above-described second embodiment.

Figure 13:
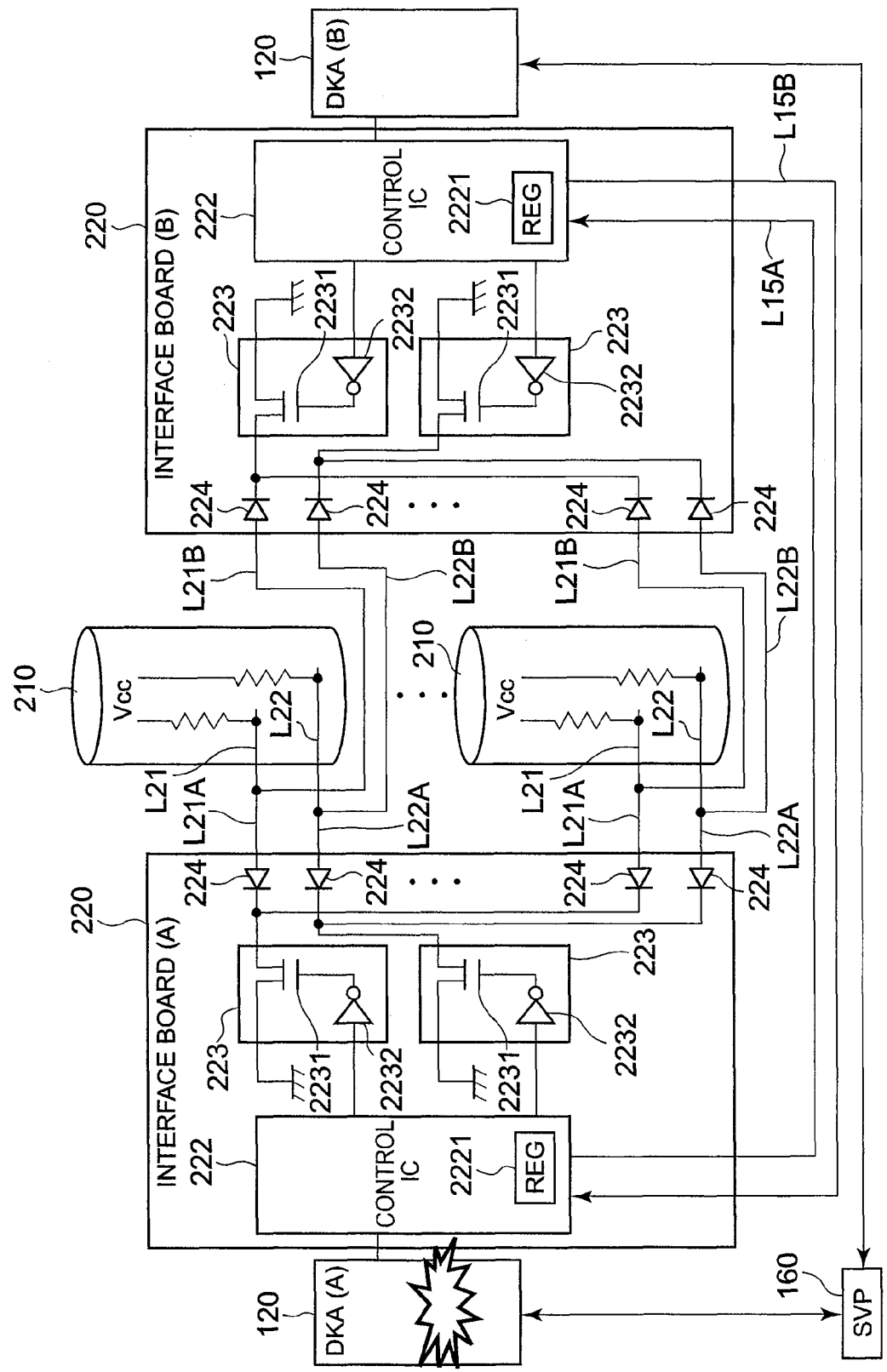
FIG. 13 is a circuit diagram showing a feature of the constitution of a storage control system related to a third embodiment.

FIG. 13 is a schematic diagram showing a feature of the storage control system 10 according to this embodiment. In this embodiment, the I/F boards 220 of system A are respectively connected to the corresponding I/F boards 220 of system B by way of signal lines L5A and L5B.

Signal line L5A is a signal line for furnishing an indication from the control IC 222 inside an I/F board 220 of system A to the control IC 222 inside the corresponding I/F board 220 of system B. The start of initialization control is indicated using this signal line L5A. Therefore, this signal line L5A, for example, can be called the initialization signal line. Similarly, signal line L5B is a signal line, which furnishes an indication for commencing initialization control from the control IC 222 inside an I/F board 220 of system B to the control IC 222 inside the corresponding I/F board 220 of system A. This signal line L5B can also be called the initialization signal line.

When a failure occurs in the DKA 120 of system A, the respective I/F boards 220 of system B issue an indication to the I/F boards 220 of system A via signal line L5B to initialize control signals. Similarly, when a failure occurs in the DKA 120 of system B, the I/F boards 220 of system A issue an indication to the I/F boards 220 of system B via signal line L5A to initialize control signals. This embodiment will be explained by giving an example in which a failure occurs in the DKA 120 of system A.

Figure 14:
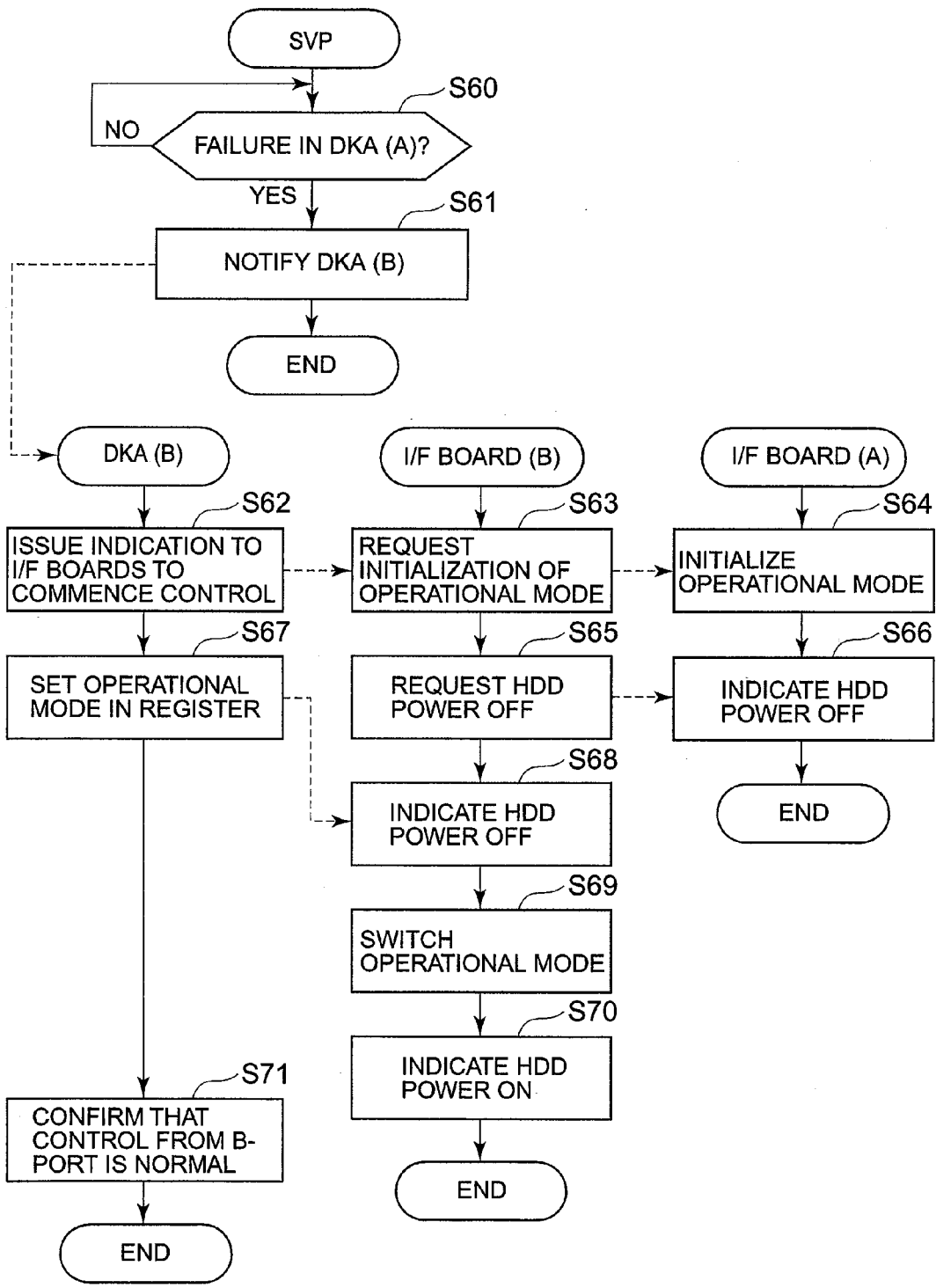
FIG. 14 is a flowchart showing the process for setting up a disk drive from the other access channel when a failure occurs along the one access channel.

FIG. 14 is a flowchart showing the process for changing a setting subsequent to operation commencement according to this embodiment. The SVP 160 monitors the various states inside the storage control system 10. The SVP 160, upon detecting a failure in the DKA 120 of system A (S60: YES), notifies the DKA 120 of system B to the effect that a failure has occurred in the DKA 120 of system A (S61).

The DKA 120 of system B, upon receiving the notification from the SVP 160, issue an indication to the I/F boards 220 of system B to commence initialization control (S62). In the figure, due to space constraints, the indication for commencing initialization control is depicted as the "control start indication". Initialization control, for which commencement is indicated in S62, is processing for resetting the respective control signals outputted from the I/F boards 220 of system A to the initial state in accordance with an indication from the I/F boards 220 of system B.

The I/F boards 220 of system B, upon receiving an indication from the DKA 120 of system B, respectively request the corresponding I/F boards 220 of system A via signal line L5B to initialize the operational mode (S63). The I/F boards 220 of system A respectively output control signals for initializing the operational mode in accordance with the requests from the I/F boards 220 of system B (S64), That is, the I/F boards 220 of system A set all the signal values of the control signals outputted from the switches 223 to the open state.

The I/F boards 220 of system B request the corresponding I/F boards 220 of system A to issue an indication to the direct current power unit 240 to turn the power OFF (S65). The I/F boards 220 of system A, which receive this request, issue an indication to the direct current power unit 240 to turn the power OFF (S66). More accurately, the I/F boards 220 of system A stop the power ON indication being given to the direct current power unit 240. However, because a power ON indication is being furnished to the direct current power unit 240 from the I/F boards 220 of system B at S65, the direct current power unit 240 does not stop, and the disk drives 210 are supplied with direct current power.

The DKA 120 of system B sets the desired operational mode in the registers 2221 inside the I/F boards 220 of system B (S67). When the operational mode is set in the registers 2221, the I/F boards 220 of system B issue an indication to the direct current power unit 240 to turn power OFF (S68). The same as above, more accurately, the I/F boards 220 of system B stop the power ON indication being furnished to the direct current power unit 240. Consequently, the furnishing of power ON indications to the direct current power unit 240 is halted from both system A and system B. Therefore, the direct current power unit 240 stops supplying direct current power to the disk drives 210.

The I/F boards 220 of system B prepare for switching the operational mode by outputting control signals from the switches 223 in accordance with the values set in the registers 2221 (S69). Since the I/F boards 220 of system A have already set the signal values of the respective control signals to the open state in S64, in S69, a combination of signal values for achieving the operational mode requested from the DKA 120 of system B can be produced by simply setting the signal value of either one of control signal 1 or control signal 2 to the low-voltage state.

Next, the I/F boards 220 of system B furnish indications to the direct current power unit 240 to turn the power ON (S70). The direct current power unit 240, to which the power ON indications are furnished, supplies direct current power to the disk drive 210, thereby starting up the disk drive 210. The control circuit 211 inside the disk drive 210 reads in the signal values of the respective signal lines L21, L22, and sets the operational mode corresponding to the combination of these signal values.

Finally, the DKA 120 of system B confirms that the system B access channel is operating normally, and ends this processing (S71).

Being constituted as described hereinabove, this embodiment also exhibits the same effect as the above-described first embodiment. Further, this embodiment can change the settings of the respective disk drives 210 using either one of the access channels subsequent to the storage control system 10 commencing operation the same as the above-mentioned second embodiment, thereby enhancing usability. The constitution of this embodiment can be combined with the constitution of the above-mentioned first embodiment as was described in the above-mentioned second embodiment.

Fourth Embodiment

Figure 15:
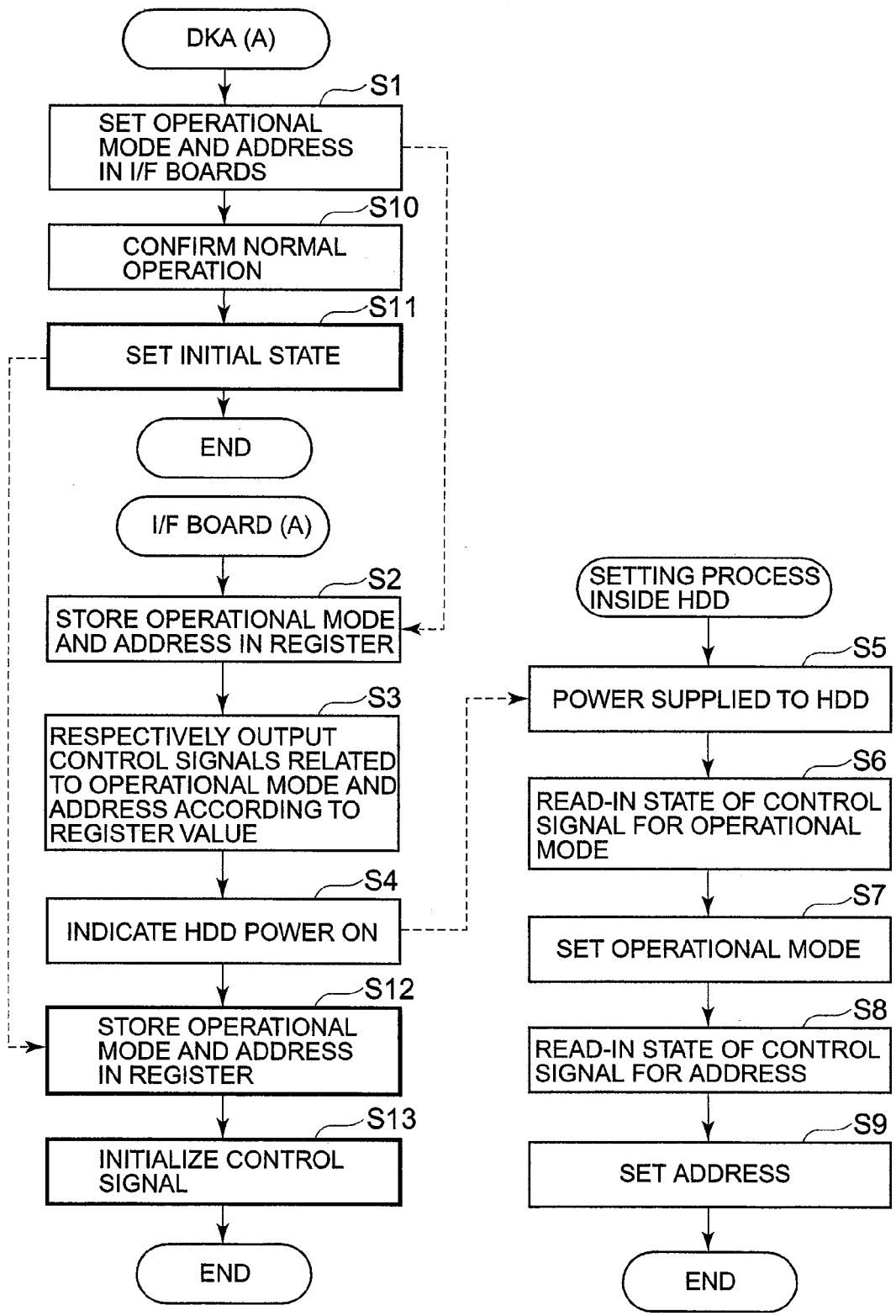
FIG. 15 is a flowchart of a disk drive setting process executed by a storage control system related to a fourth embodiment.

A fourth embodiment will be explained based on FIG. 15. This embodiment resets the respective control signals to the initial state after the respective disk drives 210 have been initialized. FIG. 15 is a flowchart of the setting process executed by a storage control system 10 according to this embodiment.

The flowchart of FIG. 15 comprises all the steps (S1 through S10) in the flowchart explained in FIG. 6, and comprises new steps (S11 through S13). Accordingly, a duplicative explanation will be omitted, and the explanation will focus on the constitution peculiar to this embodiment.

The operational modes and drive addresses are respectively set in the disk drives 210 by executing S1 through S9 in sequence. The DKA 120 of system A confirms that the settings are completed normally (S10). In this embodiment, the signal values of the respective signal lines L21, L22, L31, L32 are returned to the initial state (open state) subsequent to S10.

The DKA 120 of system A, subsequent to initializing the disk drives 210 (S10), resets the operational mode and so forth to the initial state (S11). The I/F boards 220 of system A rewrite the values of the registers 2221 in accordance with the initialization request indication from the DKA 120 (S12), and return the control signals to the initial state (S13).

Consequently, the signal values of the respective signal lines L21, L22, L31, L32 respectively transition to the open state. However, as described hereinabove, the constitution is such that the signal values of the respective signal lines L21, L22, L31, L32 are read in and the operational mode set when a disk drive 210 is supplied with direct current power and starts up. Therefore, the settings of the disk drives 210 are not changed even when the control signals are returned to the initial state in S13.

Being constituted as described hereinabove, this embodiment also exhibits the same effect as the above-mentioned first embodiment. Additionally, in this embodiment, since the constitution is such that the signal value of a control signal is returned to the initial state subsequent to setting a disk drive 210, even if a failure should occur in the DKA 120 of system A after the storage control system 10 commences operation, the settings of the respective disk drives 210 can be easily changed. That is, in this embodiment, because the control signals outputted from the I/F boards 220 of system A return to the initial state after initialization ends, as in the above-mentioned second embodiment and the above-mentioned third embodiment, there is no need to return the control signals of system A to the initial state after a failure occurs in the system A access channel. Therefore, the settings of the disk drives 210 can be changed using a constitution that is simpler that those of the above-mentioned second embodiment and the above-mentioned third embodiment.

Fifth Embodiment

A fifth embodiment will be explained based on FIG. 16. In this embodiment, the constitution is such that an operational mode and a drive address can be set using a manual switch 225, and this manual setting can be monitored. An explanation of the constitution shared in common with the above-mentioned first embodiment will be omitted, and the explanation will focus on the constitution characteristic of this embodiment.

Figure 16:
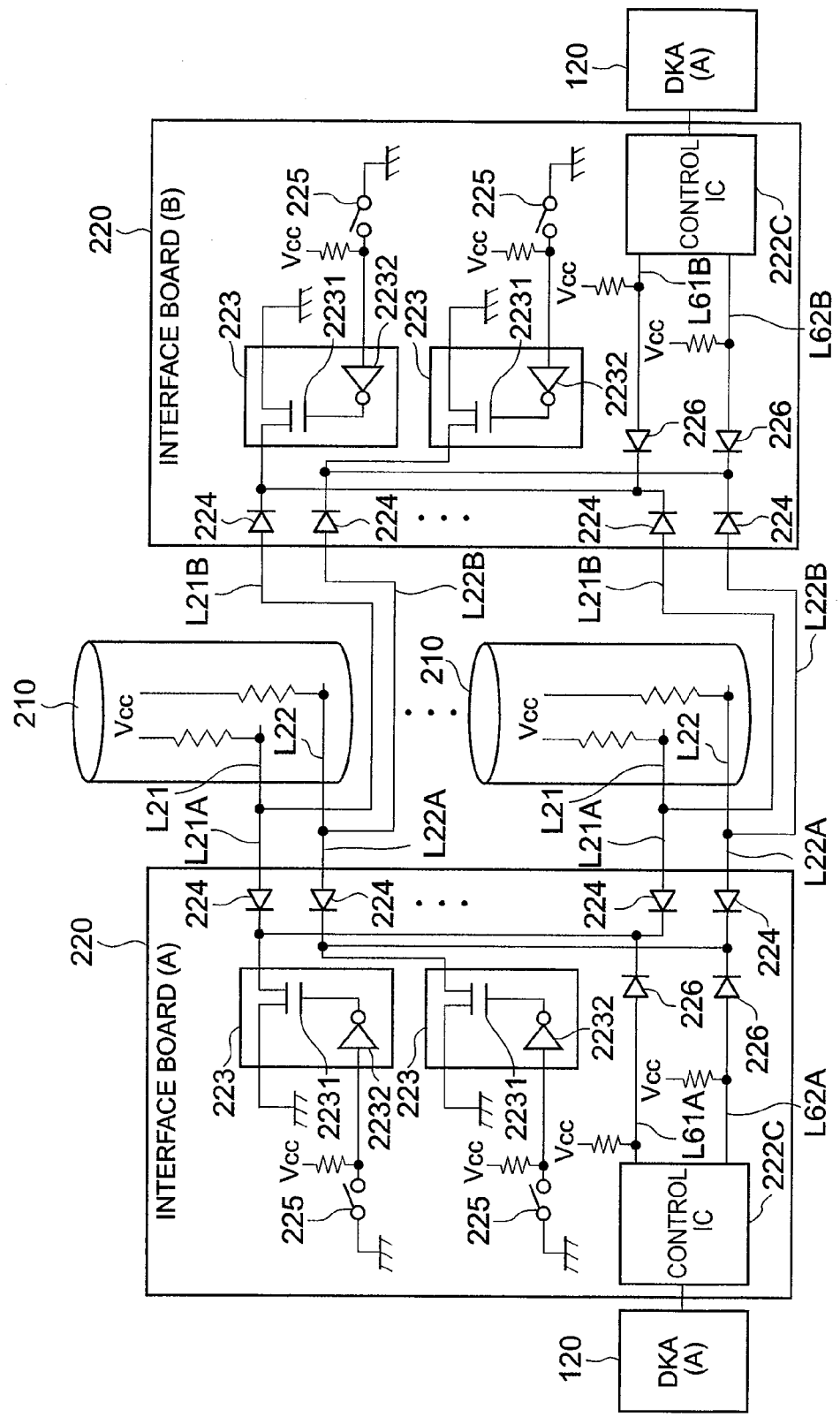
FIG. 16 is a circuit diagram showing a feature of the constitution of a storage control system related to a fifth embodiment.

FIG. 16 is a schematic diagram that focuses on an I/F board 220 and so forth utilized in the storage control system 10 according to this embodiment. In this embodiment, the analog switches 223 are not operated by the control IC 222, but rather, are operated by manual switches 225. That is, for example, normally open-type manual switches 225 are connected to the bases of the analog switches 223, and pulled up between the manual switches 225 and the bases of the analog switches 223.

When a manual switch 225 is closed, an H-level high-voltage signal is inputted to the base of the switch 223, and the switch 223 outputs a control signal of the open state. By contrast to this, when a manual switch 225 is open, an L-level low-voltage signal is inputted to the switch 223, and the switch 223 outputs a control signal of the low-voltage state (L). As defined in the mode setting table T1, the operational mode of a disk drive 210 is set in accordance with a combination of control signals outputted from the switches 223.

A user respectively manipulates the manual switches 225 of system A and system B to set a combination of control signals for achieving a desired operational mode and so forth. Thereafter, when a disk drive 210 starts up, the desired operational mode and so forth are set in the respective disk drives 210.

The control IC 222C of this embodiment has a different role than the control IC 222 described in the above-mentioned first embodiment, and is constituted so as to monitor a setting by a manual switch 225. That is, the control IC 222C is respectively connected to the collectors of the switches 223 via monitoring signal lines L61A and L61B. A counterflow prevention diode 226 is provided midway along the monitoring signal lines L61A, L61B, and the monitoring signal lines L61A, L61B are pulled up. Accoring, the control IC 222C can detect the state of a switch 223, and communicate the result of this detection to the DKA 120. The SVP 160 can learn the state of a switch 223 via the DKA 120. That is, the SVP 160 can monitor whether the signal value of a control signal is in the open state, or in the low-voltage state by way of the DKA 120 and control IC 222C.

Furthermore, FIG. 16 shows a constitution related to setting an operational mode, but setting a driver address can also be realized using a constitution similar to the constitution for setting an operational mode.

In this embodiment, as described hereinabove, the operational modes and so forth of the disk drives 210 are set by the user manipulating the manual switches 225. Therefore, there is the likelihood of a human error occurring. For example, the user could properly set the manual switches 225 of system B, but improperly set one of the manual switches 225 of system A.

If the user improperly sets a manual switch 225, this erroneous setting is detected by the control IC 222C, and notified to the user by way of the SVP 160. The user can correct the setting of the manual switch 225 in accordance with a warning from the SVP 160.

However, for example, if a power failure occurs in an I/F board 220, the operation of the control IC 222C will stop, making it impossible to detect and warn of a user's erroneous setting. That is, the likelihood of an improper setting by a user and a failure in an I/F board 220 occurring simultaneously must be taken into consideration.

When an I/F board 220 failure and human error overlap one another, the switches 223 will respectively output control signals of the open state regardless of the manual switch 225 settings. Therefore, if the manual settings of the normally operating access channel (in this explanation, the system B access channel) are correct, the desired operational modes and so forth can be properly set in the respective disk drives 210.

Furthermore, the present invention is not limited to the respective embodiments described hereinabove. A person with an ordinary skill in the art will be able to make various additions and changes within the scope of the present invention.

What is claimed is:
1. A storage control system, comprising:
at least one or more storage devices for which a device state is set in accordance with a combination of respective signal values of a plurality of first signals respectively inputted via a plurality of signal lines;
a first setting circuit which is connected to said storage device via said signal lines, and which respectively outputs said first signal over said signal lines in accordance with an inputted second signal;
a second setting circuit which is logical-OR connected to said first setting circuit, and which respectively outputs said first signal over said signal lines in accordance with said inputted second signal;
a first device controller for respectively outputting said first signals from said first setting circuit by furnishing said second signal to said first setting circuit; and
a second device controller for respectively outputting said first signals from said second setting circuit by furnishing said second signal to said second setting circuit,
wherein said first signals take a signal value of either one of an open state or a low-voltage state, and
wherein said device state comprises an initial state and a plurality of other states, and, furthermore, a combination of signal values of said first signals for setting said initial state, and a combination of signal values of said first signals for respectively setting said plurality of other states are set in advance so as to differ from one another.

2. The storage control system according to claim 1, wherein, when the respective signal values of said first signals are the open state, said device state is set to said initial state.

3. The storage control system according to claim 1, wherein said first setting circuit and said second setting circuit respectively comprise:
a plurality of switching elements for respectively outputting said first signal over said signal lines; and
a control unit which respectively outputs said first signal of a signal value of either said open state or said low-voltage state from said switching elements in accordance with said second signal.

4. The storage control system according to claim 3, wherein said switching elements are constituted as normally open-type transistor switches in which a base is connected to said control unit, a collector is connected to said storage device via a diode for preventing reverse connection, and an emitter is grounded.

5. The storage control system according to claim 3, wherein said control unit comprises a plurality of manual switches which are respectively connected to said switching elements.

6. The storage control system according to claim 3, wherein said first setting circuit and said second setting circuit further comprise a monitoring unit for monitoring a signal value of said first signal respectively outputted from said switching elements.

7. The storage control system according to claim 1, wherein at startup said storage device respectively acquires signal values of said first signals via each of said signal lines, and sets a device state in accordance with a combination of acquired said signal values.

8. The storage control system according to claim 1, wherein the setting of said plurality of other states comprises at least either one of an identification information setting for specifying said storage device, or an operational mode setting of said storage device.

9. The storage control system according to claim 1, wherein, when a failure occurs in said first device controller, said first device controller requests that said first setting circuit perform initialization, and consequently, said first setting circuit sets all signal values of said first signals to the open state and respectively outputs same over said signal lines, and said device state is set by said first signals to be outputted from said second setting circuit, and when a failure occurs in said second device controller, said second device controller requests that said second setting circuit perform initialization, and consequently, said second setting circuit sets all signal values of said first signals to the open state and respectively outputs same over said signal lines, and said device state is set by said first signals to be outputted from said first setting circuit.

10. The storage control system according to claim 1, wherein said first setting circuit and said second setting circuit are connected to one another, and when a failure occurs in said first device controller, said second setting circuit requests that said first setting circuit perform initialization, and consequently, said first setting circuit sets all signal values of said first signals to the open state and respectively outputs same over said signal lines, and said device state is set by said first signals to be outputted from said second setting circuit, and when a failure occurs in said second device controller, said first setting circuit requests that said second setting circuit perform initialization, and consequently, said second setting circuit sets all signal values of said first signals to the open state and respectively outputs same over said signal lines, and said device state is set by said first signals to be outputted from said first setting circuit.

11. A control method for a storage control system having a plurality of storage devices for which a device state is set in accordance with a combination of respective signal values of a plurality of first signals respectively inputted via a plurality of signal lines;

a first setting circuit which is connected to said storage device via said signal lines, and which respectively outputs said first signal over said signal lines in accordance with an inputted second signal;

a second setting circuit which is logical-OR connected to said first setting circuit, and which respectively outputs said first signal over said signal lines in accordance with said inputted second signal;

a first device controller for respectively outputting said first signals from said first setting circuit by furnishing said second signal to said first setting circuit; and a second device controller for respectively outputting said first signals from said second setting circuit by furnishing said second signal to said second setting circuit, wherein said first signals take a signal value of either one of an open state or a low-voltage state, wherein said device state comprises an initial state and a plurality of other states, and a combination of signal values of said first signals for setting said initial state, and a combination of signal values of said first signals for respectively setting said plurality of other states are set in advance so as to differ from one another, and furthermore, and wherein said control method comprises:

a failure detection step of detecting whether or not a failure has occurred in either of said first device controller or said second device controller; and a setting step in which, when said failure is detected, a normal device controller in which said failure has not been detected outputs over said signal lines a desired combination of signal values of said first signals using a setting circuit, of either said first setting circuit or said second setting circuit, which is connected to said normal device controller.

12. The control method for a storage control system according to claim 11, further comprising:

an initialization step of, between said failure detection step and said setting step, respectively outputting over said signal lines said first signals for setting said device state to said initial state from a setting circuit, of either said first setting circuit or said second setting circuit, which is connected to said failure-detected device controller.

13. A control method for a storage control system having a plurality of storage devices for which a device state is set in accordance with a combination of respective signal values of a plurality of first signals respectively inputted via a plurality of signal lines;

a first setting circuit which is connected to said storage device via said signal lines, and which respectively outputs said first signal over said signal lines in accordance with an inputted second signal;

a second setting circuit which is logical-OR connected to said first setting circuit, and which respectively outputs said first signal over said signal lines in accordance with said inputted second signal;

a first device controller for respectively outputting said first signals from said first setting circuit by furnishing said second signal to said first setting circuit; and a second device controller for respectively outputting said first signals from said second setting circuit by furnishing said second signal to said second setting circuit, wherein said first signals take a signal value of either one of an open state or a low-voltage state, and wherein said device state comprises an initial state and a plurality of other states, and a combination of signal values of said first signals for setting said initial state, and a combination of signal values of said first signals for respectively setting said plurality of other states are set in advance so as to differ from one another, and furthermore, said control method comprises:

a failure detection step of detecting whether or not a failure has occurred in either of said first setting circuit or said second setting circuit; and a setting step in which, when said failure is detected, a normal setting circuit in which said failure has not been detected outputs over said signal lines a desired combination of signal values of said first signals.

14. The control method for a storage control system according to claim 13, further comprising:

an initialization step of, between said failure detection step and said setting step, respectively outputting over said signal lines said first signals for setting said device state to said initial state from a setting circuit, of either said first setting circuit or said second setting circuit, in which said failure has been detected.

* * * * *